United States Patent
Speasl et al.

(10) Patent No.: US 11,212,416 B2
(45) Date of Patent: Dec. 28, 2021

(54) SECURE DIGITAL MEDIA CAPTURE AND ANALYSIS

(71) Applicant: ImageKeeper LLC, Las Vegas, NV (US)

(72) Inventors: Jerry Speasl, Las Vegas, NV (US); Marc Roberts, St. Louis, MO (US); Mike Patterson, Sherman, TX (US)

(73) Assignee: IMAGEKEEPER LLC, Las Vegas, NV (US)

( * ) Notice: Subject to any disclaimer, the term of this patent is extended or adjusted under 35 U.S.C. 154(b) by 0 days.

(21) Appl. No.: 16/505,305

(22) Filed: Jul. 8, 2019

(65) Prior Publication Data
US 2020/0014816 A1 Jan. 9, 2020

Related U.S. Application Data

(60) Provisional application No. 62/694,528, filed on Jul. 6, 2018.

(51) Int. Cl.
*H04N 5/225* (2006.01)
*H04N 1/32* (2006.01)

(52) U.S. Cl.
CPC . *H04N 1/32128* (2013.01); *H04N 2201/0084* (2013.01); *H04N 2201/3253* (2013.01)

(58) Field of Classification Search
CPC .................................................. H04N 1/00129
See application file for complete search history.

(56) References Cited

U.S. PATENT DOCUMENTS

| 4,876,597 | A | 10/1989 | Roy et al. |
| 5,343,527 | A | 8/1994 | Moore |
| 5,553,609 | A | 9/1996 | Chen et al. |
| 5,737,491 | A | 4/1998 | Allen et al. |
| 6,038,295 | A | 3/2000 | Mattes |
| 6,122,526 | A | 9/2000 | Parulski et al. |
| 6,182,219 | B1 | 1/2001 | Feldbau et al. |
| 6,256,059 | B1 | 7/2001 | Fichtner |
| 6,278,466 | B1 | 8/2001 | Chen et al. |
| 6,304,211 | B1 | 10/2001 | Boman |
| 6,370,568 | B1 | 4/2002 | Garfinkle |
| 6,584,564 | B2 | 6/2003 | Olkin et al. |

(Continued)

FOREIGN PATENT DOCUMENTS

WO  WO 2020/010355  1/2020

OTHER PUBLICATIONS

PCT Application No. PCT/US2019/040852 International Search Report and Written Opinion dated Oct. 22, 2019.

(Continued)

*Primary Examiner* — Gary C Vieaux
(74) *Attorney, Agent, or Firm* — Polsinelli LLP

(57) ABSTRACT

Systems and methods for generating certified images, annotations, and incident reports are disclosed. A media capture device can be used to capture a media asset and related metadata. The image and its metadata can then be certified upon capture so that it can be verified as authentic and unaltered after certification. The certified media asset can then be included in or as a part of an incident report, which may optionally align multiple media assets along a path based on location and time of capture. The report may itself be certified and synchronized with a cloud server system.

21 Claims, 18 Drawing Sheets

(56) References Cited

U.S. PATENT DOCUMENTS

| | | |
|---|---|---|
| 6,662,226 B1 | 12/2003 | Wang et al. |
| 6,751,454 B2 | 6/2004 | Thornton |
| 6,784,925 B1 | 8/2004 | Tomat et al. |
| 6,847,334 B2 | 1/2005 | Hayhurst et al. |
| 6,995,789 B2 | 2/2006 | Mcintyre et al. |
| 7,028,184 B2 | 4/2006 | Hind et al. |
| 7,034,880 B1 | 4/2006 | Endsley et al. |
| 7,170,551 B2 | 1/2007 | Fichtner |
| 7,188,307 B2 | 3/2007 | Ohsawa |
| 7,239,346 B1 | 7/2007 | Priddy |
| 7,343,049 B2 | 3/2008 | Bulterworth |
| 7,526,718 B2 * | 4/2009 | Samadani ............ G11B 27/031 715/201 |
| 8,224,178 B2 | 7/2012 | Keane |
| 8,634,712 B1 | 1/2014 | Mullins |
| 9,094,543 B2 | 4/2015 | Mullins |
| 9,538,336 B2 | 1/2017 | Rudow et al. |
| 10,048,378 B2 | 8/2018 | Gogolla et al. |
| 10,101,465 B2 | 10/2018 | Loomis et al. |
| 10,282,562 B1 * | 5/2019 | Speasl ................ H04N 21/2351 |
| 10,318,110 B2 * | 6/2019 | Naaman ................ G06F 3/0481 |
| 10,360,705 B2 * | 7/2019 | Cervelli .................. G06T 11/60 |
| 10,444,941 B2 * | 10/2019 | Cervelli ................ G06T 11/001 |
| 2002/0108118 A1 | 8/2002 | Cohen et al. |
| 2002/0122568 A1 | 9/2002 | Zhao |
| 2002/0147618 A1 | 10/2002 | Mezrah et al. |
| 2002/0186412 A1 | 12/2002 | Murashita |
| 2003/0085989 A1 | 5/2003 | Tay |
| 2004/0012811 A1 | 1/2004 | Nakayama |
| 2004/0174434 A1 | 9/2004 | Walker et al. |
| 2004/0217884 A1 * | 11/2004 | Samadani ............ G01C 21/20 340/995.14 |
| 2004/0218894 A1 * | 11/2004 | Harville ................ H04N 5/9201 386/241 |
| 2004/0218895 A1 * | 11/2004 | Samadani ............ G06F 16/29 386/241 |
| 2004/0218910 A1 * | 11/2004 | Chang ................ G01C 21/3647 386/241 |
| 2004/0221227 A1 * | 11/2004 | Wu ........................ G06F 16/739 715/202 |
| 2004/0264542 A1 | 12/2004 | Kientz |
| 2005/0036034 A1 | 2/2005 | Rea et al. |
| 2005/0062851 A1 | 5/2005 | Silverbrook et al. |
| 2005/0110880 A1 | 5/2005 | Parulski et al. |
| 2005/0114459 A1 | 5/2005 | Tu et al. |
| 2006/0105806 A1 | 5/2006 | Vance et al. |
| 2006/0114338 A1 | 6/2006 | Rothschild |
| 2006/0248348 A1 | 11/2006 | Wakao et al. |
| 2007/0008321 A1 | 1/2007 | Gallagher et al. |
| 2007/0063033 A1 | 3/2007 | Silverbrook et al. |
| 2007/0073937 A1 | 3/2007 | Feinberg et al. |
| 2007/0074035 A1 | 3/2007 | Scanlon et al. |
| 2008/0219658 A1 | 9/2008 | Keane et al. |
| 2009/0031425 A1 | 1/2009 | Basson et al. |
| 2011/0137561 A1 | 6/2011 | Kankainen |
| 2011/0235923 A1 | 9/2011 | Weisenburger et al. |
| 2011/0276423 A1 | 11/2011 | Davidson |
| 2012/0086971 A1 | 4/2012 | Bisbee et al. |
| 2013/0046461 A1 | 2/2013 | Balloga |
| 2013/0080051 A1 | 3/2013 | Gribkov et al. |
| 2014/0049653 A1 | 2/2014 | Leonard et al. |
| 2014/0114691 A1 | 4/2014 | Pearce |
| 2014/0125822 A1 * | 5/2014 | Mullins .............. H04N 1/00307 348/207.1 |
| 2014/0152854 A1 | 6/2014 | Iwaki et al. |
| 2014/0176733 A1 | 6/2014 | Drooker et al. |
| 2014/0281520 A1 | 9/2014 | Selgas et al. |
| 2014/0304184 A1 | 10/2014 | Fletcher |
| 2015/0098021 A1 | 4/2015 | O'Sullivan et al. |
| 2015/0312227 A1 | 10/2015 | Follis et al. |
| 2015/0334257 A1 | 11/2015 | Woods |
| 2016/0042767 A1 | 2/2016 | Araya et al. |
| 2016/0138919 A1 | 5/2016 | Green et al. |
| 2016/0169856 A1 | 6/2016 | Sung |
| 2016/0210734 A1 | 7/2016 | Kass et al. |
| 2017/0140492 A1 * | 5/2017 | Leonard ............ H04N 5/23222 |
| 2019/0325164 A1 | 10/2019 | Speasl |
| 2020/0151363 A1 | 5/2020 | Speasl |

OTHER PUBLICATIONS

U.S. Appl. No. 15/051,569 Final Office Action dated Aug. 14, 2019.
U.S. Appl. No. 15/051,569 Office Action dated Feb. 8, 2019.
U.S. Appl. No. 15/052,774 Final Office Action dated Jun. 1, 2018.
U.S. Appl. No. 15/052,774 Office Action dated Aug. 7, 2017.
U.S. Appl. No. 16/399,785 Office Action dated Aug. 9, 2019.
U.S. Appl. No. 11/715,049 Office Action dated Dec. 14, 2011.
U.S. Appl. No. 11/715,049 Final Office Action dated Jul. 8, 2011.
U.S. Appl. No. 11/715,049 Office Action dated Jun. 12, 2009.
U.S. Appl. No. 13/491,026 Office Action dated Mar. 5, 2013.
U.S. Appl. No. 14/154,156 Office Action dated Feb. 28, 2014.
U.S. Appl. No. 14/809,068 Office Action dated Dec. 18, 2015.
U.S. Appl. No. 15/051,569 Office Action dated Apr. 29, 2020.
U.S. Appl. No. 16/741,605 Office Action dated Mar. 20, 2020.
U.S. Appl. No. 16/741,605 Final Office Action dated Jul. 24, 2020.
U.S. Appl. No. 15/051,569 Final Office Action dated Oct. 20, 2020.
U.S. Appl. No. 16/399,785 Final Office Action dated Nov. 6, 2020.
PCT Application No. PCT/US2019/040852 International Preliminary Report on Patentability dated Jan. 12, 2021.
U.S. Appl. No. 15/051,569 Office Action dated Aug. 27, 2021.
U.S. Appl. No. 17/475,847, Jerry Speasl, Secure Digital Data Collection, filed Sep. 15, 2021.
U.S. Appl. No. 17/162,629 Office Action dated Oct. 18, 2021.

* cited by examiner

Mobile enabled media and capture system with Direct Cloud compatible digital media and data output – example use in insurance flood claim system

FIG. 7

Statistical Observational Mapping Points 700

| 705 Media Capture, Time hour, second, AM/PM, Date, Zone | 710 Media ID | 715 Media Title | 720 Media Group & Title | 725 3D GPS Location & Elevation IMU-1 Data | 730 Sensor Orientation (Roll/Pitch/Yaw) and Starting Location | 735 Sensor Track & Waypoint to New Location & Acceleration | 740 Distance, Time, Dir., Elevtn. from Last Capture Loc. to New Loc., Dwell | 745 User ID, User Login, User Authoriz-ation, User Data | 750 Device Model & Type | 755 Degrees from North Compass Information | 760 Media Type: Image, Audio, Video | 765 Distance and Bearing to Objects in Media | 770 Statistical Observation Points & Mapping Thereof | 775 DEM, Digital Elevation Model Mapping on Horizontal Street View |
|---|---|---|---|---|---|---|---|---|---|---|---|---|---|---|
| 9:25:10 AM, PST ① | c872987x678 | Property: 341 Dove Dr. 94566 | Group #1: Interior left side of property, Media 1 | Actual Lat, Long, Elevation | 065 Degrees Position #1 Pitch Angle Roll Angle | 360 Degrees 2.6 ms | Strt 61950" 0.0 Sec .50 Below Base Elev. of 620'00" | F. Jones | Apple 6+ | 065 Degrees | Digital Image | 11' @ 62 Degrees -20 Degrees Pitch | Point #1 Located at: Lat/Long | |
| 9:25:14 AM, PST ② | c872987x679 | Property: 341 Dove Dr. 94566 | Group #1: Interior right side of property, Media 2 | Actual Lat, Long, Elevation | 060 Degrees Position #2 Pitch Angle Roll Angle | 010 Degrees 2.0 ms | Dist.: 12'6" 4.3 Sec 2' Downwrd ①→② | F. Jones | Apple 6+ | 060 Degrees | Digital Image | 15' @ 55 Degrees +15 Degrees Pitch | Point #2 Located at: Lat/Long | |
| ③ | c872987x680 | Property: 341 Dove Dr. 94566 | Group #1: Interior middle side of property, Media 3 | Actual Lat, Long, Elevation | 120 Degrees Position #3 Pitch Angle Roll Angle | 050 Degrees 2.5 ms | Dist.: 15'9" 6.3 Sec Upward ②→③ | F. Jones | Apple 6+ | 120 Degrees | Digital Video | 17' @ 60 Degrees +11 Degrees Pitch | Point #3 Located at: Lat/Long | |

Job Number # 417812
Address: 341 Dove Drive, 94586
GPS Address Property Center Point
Closest Fiduciary Survey Marker: Bingo 38
Nearest Cellular Tower: 87654, Bering 330 Degrees
Nearest Cross Street: Dove Dr. & Grant Ct.
Nearest WIFI Source: Xfinity 863

Map 910

Media Asset 915
Id: MDI2017467029 11:02:16 AM
Date: 7/12/2017 11:02:16 AM
Type: Photo
Latitude: 37.65127716
Longitude: -121.85468246

341 Dove Drive, 94566 USA

Focus 920

Fiduciary Survey Pt.
North 360
Cellular Antenna
River
Lake
Fault Line

Street View Media GPS, Heading & Elevation Analysis 930

| 360 | 010 | 050 | 088 | 091 | 115 | 180 | |
|---|---|---|---|---|---|---|---|
| △065 | △080 | △120 | △175 | △120 | △210 | △240 | 0 |
| 942 | 944 | 946 | 948 | 950 | 952 | 954 | 956 |
| 619'.50" | 617' | 619' | 618' | 618'30" | 618'10" | 619' | 618'10" |

620' Base Elevation
Elevation From Base

GPS Property Center

Base Elevation

FIG. 10

Incident Report 1000

ImageKeeper

January 28, 2018

Job Number # 417812
Address: 341 Dove Drive, 94566
GPS Address Property Center Point
Closest Fiduciary Survey Marker: Bingo 38
Nearest Cellular Tower: 87654, Bearing 330 Degrees
Nearest Cross Street: Dove Dr. & Grant Ct.
Nearest WIFI Source: Xfinity 663

Focus 920

Media Asset — Map 910

341 Dove Drive, 94566 USA

Street View Media GPS, Heading & Elevation Analysis 930

Media Mapping 1010 | 2nd Area Map 1030 | Street View Image 1040

Path 1010

Metadata Table 700

Photo Sheet
INC2017208779
8/21/2017 7:24:57 AM

Incident Decription 1020

Media #:           21
Media Id:          MDI2017486038
Media Title:       Daisy Blue
Media Group:       Blue Flowers
Captured On:       8/21/2017
Captured By:       Speasl, Jerry
Geospatial:        37.652314, -121.881611
Certification:     ImageKeeper Notes:
This data was captured this morning during an early morning data capture session at a local park. The data was captured for each color of flower and its same color group. I wish that I could name every flower, but I do not know the name of each individual group, so I left them unnamed. This data was captured Media #:           22
Media Id:          MDI2017486028
Media Title:       Iris – Yellow
Media Group:       Yellow flower
Captured On:       8/21/2017
Captured By:       Speasl, Jerry
Geospatial:        37.652427, -121.881719
Certification:     ImageKeeper Notes:
This data was captured this morning during an early morning data capture session at a local park. The data was captured for each color of flower and its same color group. I wish that I could name every flower, but I do not know the name of each individual group, so I left them unnamed. This data was captured this morning during an early morning data capture session at a local park. The data was captured for each color of flower and its same color group. I wish that I could name every flower, but I do not know the name of each individual group, so I left them unnamed. This data was captured

FIG. 14

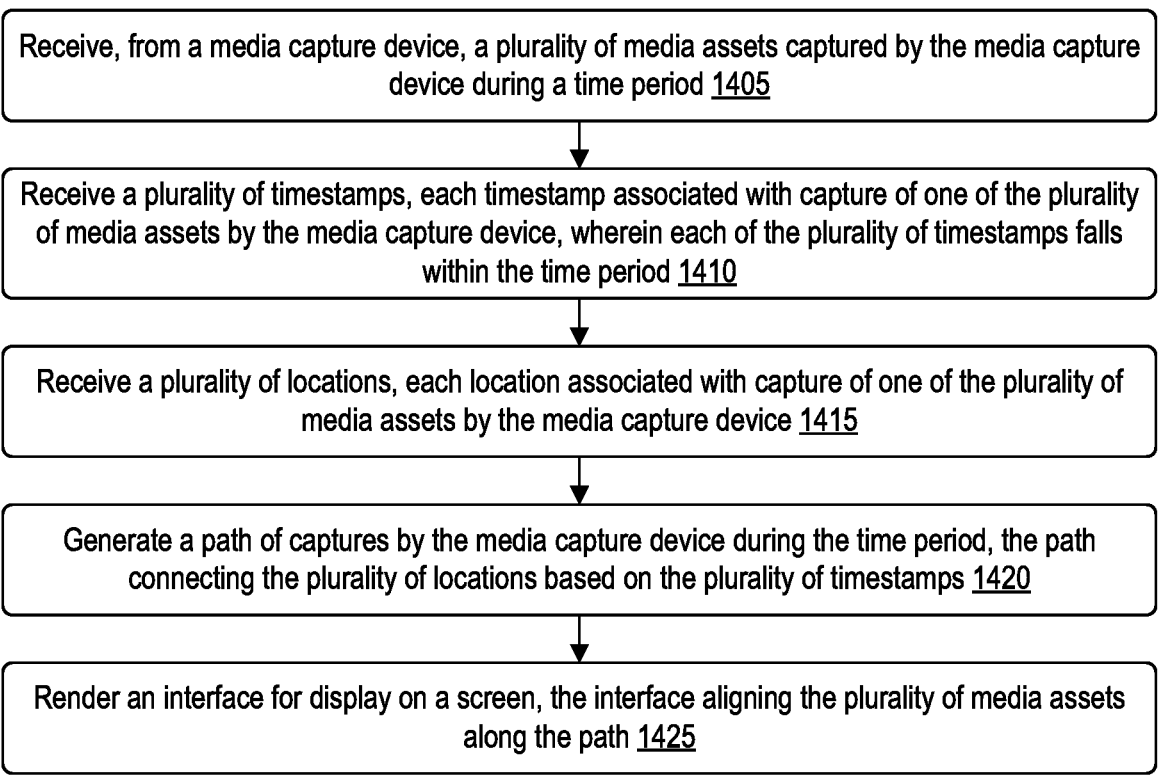

Receive, from a media capture device, a plurality of media assets captured by the media capture device during a time period 1405

Receive a plurality of timestamps, each timestamp associated with capture of one of the plurality of media assets by the media capture device, wherein each of the plurality of timestamps falls within the time period 1410

Receive a plurality of locations, each location associated with capture of one of the plurality of media assets by the media capture device 1415

Generate a path of captures by the media capture device during the time period, the path connecting the plurality of locations based on the plurality of timestamps 1420

Render an interface for display on a screen, the interface aligning the plurality of media assets along the path 1425

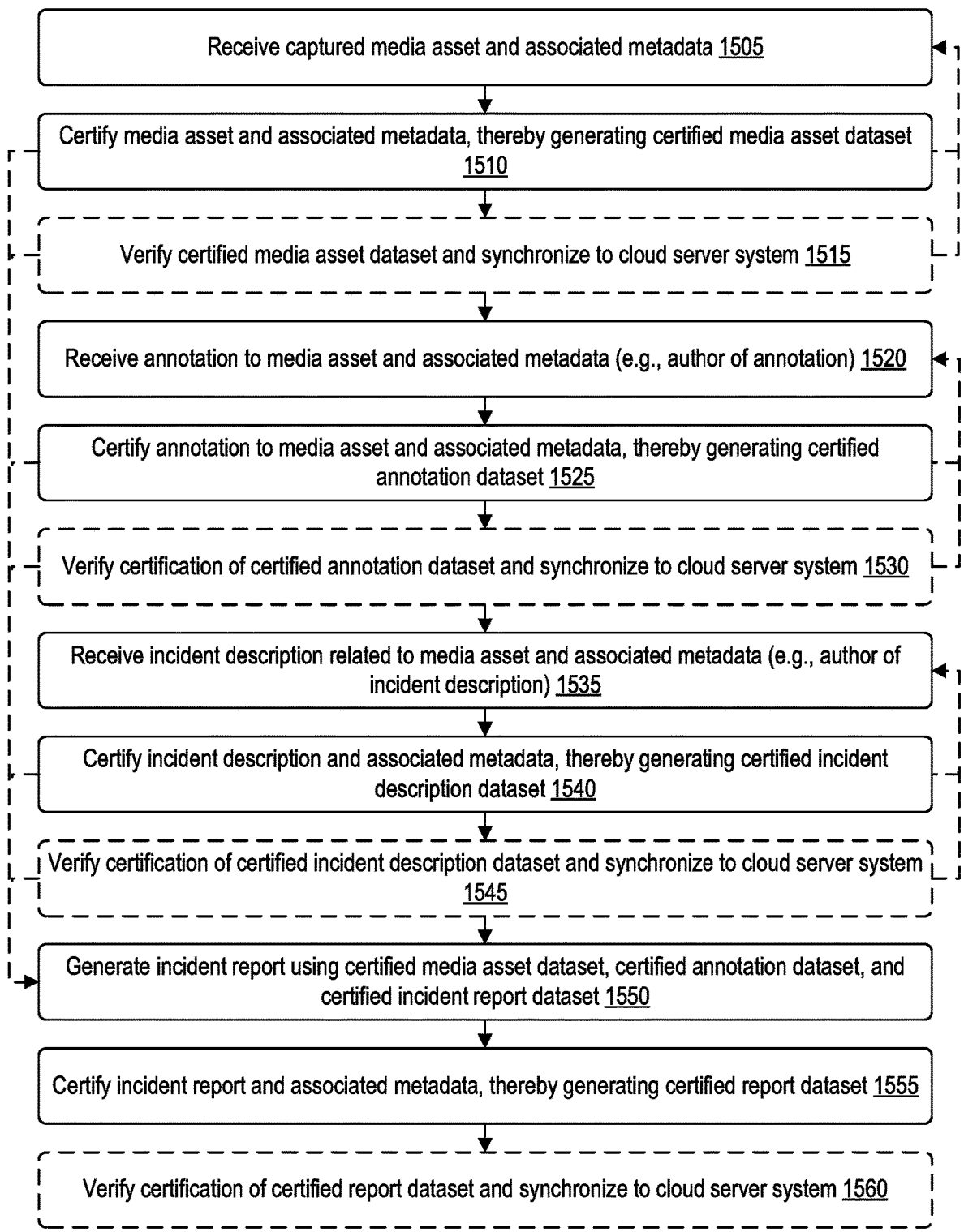

SECURE DIGITAL MEDIA CAPTURE AND ANALYSIS

CROSS-REFERENCE TO RELATED APPLICATION

The present application claims the priority benefit of U.S. provisional application No. 62/94,528 filed Jul. 6, 2018, the disclosure of which is incorporated herein by reference.

BACKGROUND

Field of the Invention

The present invention generally relates to digital media capture and synchronization. More specifically, the present invention relates to certification of digital media captured by electronic media capture devices and generation of reports using the resulting certified media.

Description of the Related Art

User devices such as smartphones or tablets can take photos using camera software applications designed to interact with camera hardware embedded in the user device. Some of these camera applications store photo metadata along with the photo. Examples of metadata include the identity the user device from which the photo was taken, latitude and longitude at which the photo was taken, and information concerning use of filters or other applications that may alter the digital image. The type, format, and details of such metadata are typically inconsistent between camera software applications, impossible to verify as unchanged, and incomplete in terms of what data is captured versus what data could potentially be captured and tied together. A user of one software application cannot rely on a specific set of metadata to be present along with the same photograph should it be taken in another application, and the user also traditionally cannot rely on data from such applications being secure or verifiably not tampered with.

Some types of positional, sensor, and other software or hardware data, while available for use, are often not stored as photo metadata or in a manner that allows for pairing of the data with a particular image. This data could be used in the context of other software applications or in the review of certain photographs. As a result, users may not be able to determine the exact positioning of a user device, an object being photographed, or the output of other sensors while or when the photo was being taken.

Photographs are also often used in creating an incident report. Creating an incident report usually involves transcribing details of an incident details such as a car accident or structural damage to a home from personal or third-party observation to handwritten form. Those handwritten notes are then entered into a computer or program operating thereon. Photographs related to the incident and showing the accident or damage are usually scanned or uploaded into the aforementioned computer or program by way of a physical or network connection. Traditionally, these images would have be—as a matter of course and necessity—accepted at face value with no reliable way to ascertain if the images were authentic or unaltered. The transcribed information such as the location and physics of an incident, too, were not always accurate due to human transcription or data entry error or a misreading of image data.

There is a need in the art to more completely collect available sources of metadata as they pertain to digital imagery—both still and moving. Further, there is a need in the art to better correlate such metadata to files or documents that may be associated with a digital image. Finally, there is a need in the art to be able to verify the accuracy of a digital image, the metadata therein, as well as any data that might be based on, related to, or otherwise derived from that image.

BRIEF DESCRIPTION OF THE DRAWINGS

FIG. 7 is a table illustrating metadata for three digital media assets captured at different times.

FIG. 9 illustrates an interface with multiple types of media asset and metadata analyses, including mapping of media assets and metadata, focused analyses, and elevation analyses.

FIG. 10 illustrates an incident report generated using the analyses of FIG. 9.

FIG. 14 is a flow diagram illustrating generation of a path of a capture device aligned to media captured by the capture device.

FIG. 15 is a flow diagram illustrating certification of media, annotations of media, and reports.

DETAILED DESCRIPTION

Systems and methods for generating certified images, annotations, and incident reports are disclosed. A media capture device can be used to capture a media asset and related metadata. The image and its metadata can then be certified upon capture so that it can be verified as authentic and unaltered after certification. The certified media asset can then be included in or as a part of an incident report (e.g., for social media, news, or insurance), which may optionally align multiple media assets along a path based on location and time of capture. The report may itself be certified on a mobile device and synchronized with a cloud server system.

Figure 1:
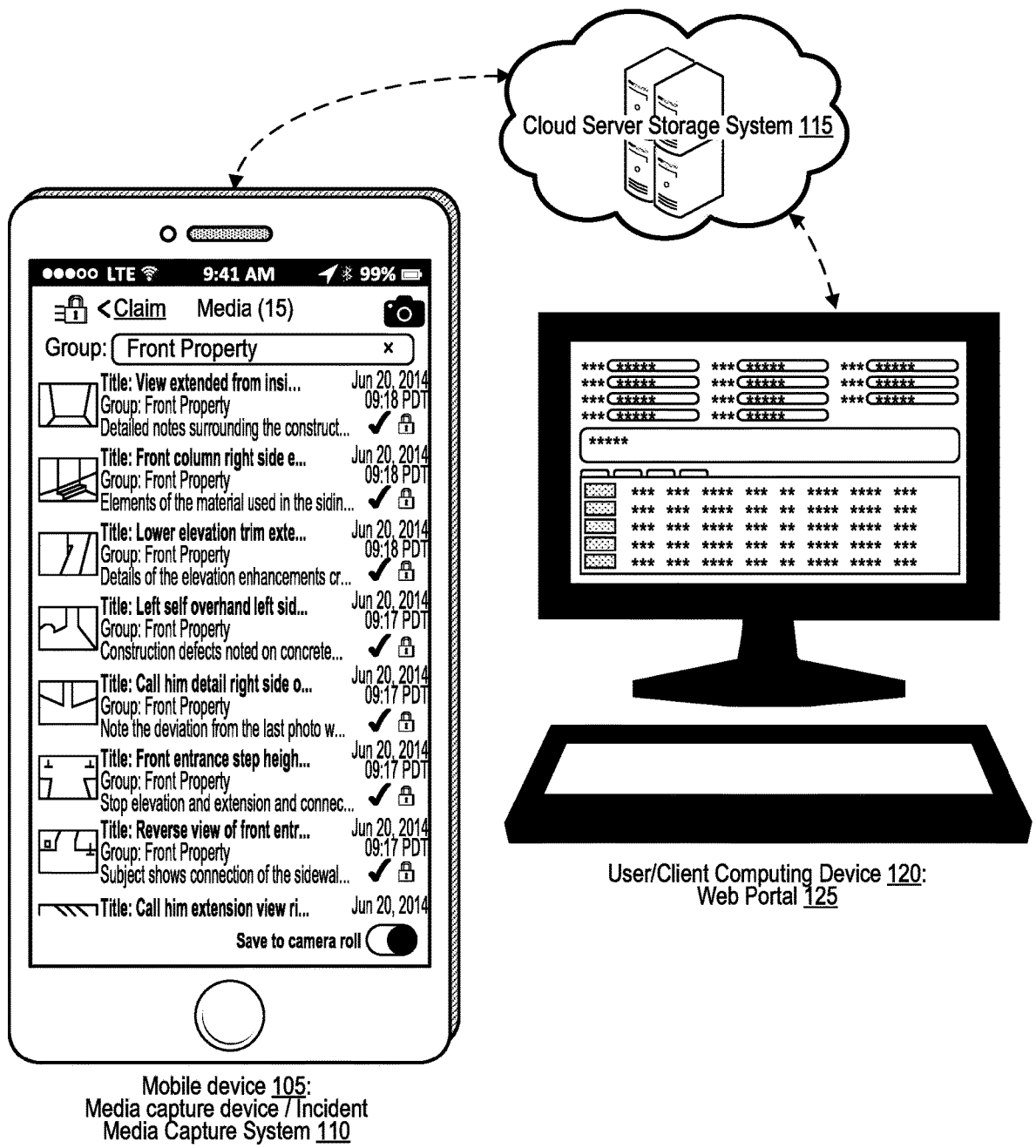
FIG. 1 illustrates an overview of a cloud server storage system that provides secure synchronization between a mobile device media capture system and a server-based web service accessible through a web portal.

FIG. 1 illustrates an overview of a cloud server storage system that provides secure synchronization between a mobile device media capture system and a server-based web service accessible through a web portal.

In particular, the architecture illustrated in FIG. 1 illustrates a mobile device 105 that represents a media capture device, also referred to as an incident media capture system 110. A touchscreen display (or other display) of the mobile device 105 illustrates a graphical user interface (GUI) listing different certified media assets—that is, certified images and/or videos and/or audio—of a front of a property. Certified media assets may also include audio and/or various sensor readings as discussed further. Each listed item in the GUI includes a thumbnail of a certified media that can be expanded into the full certified media assets, a title describing the certified media assets, a group (these are all grouped as "front property"), a note, a timestamp and date of capture, an icon representing directional and location data, a momentary spinning and numbered icon denoting data is being transmitted to the cloud, a checkmark icon representing confirmation that data arrived and stored in cloud, and a note or description.

The data is captured by the media capture device (mobile device 105) and sensor hardware that connects to the mobile device 105 in a wired or wireless fashion as described further herein. The mobile device 105 and any sensor hardware it is connected to represent the incident media capture system 110. The sensor hardware may include manned vehicles or unmanned vehicles that are autonomous, self-driving, remote controlled, and/or semi-autonomous. Such manned or unmanned vehicles include aerial, aquatic, or land vehicles. Sensors on such vehicles may capture data as part of the incident media capture system 110 as per FIG. 11.

The web portal 125 may be a website hosted at the cloud server system 115 or hosted elsewhere on a host server or directly in a data center. The web portal 125 provides access to reports generated by the cloud server system 115 based on incidents identified via the mobile device 105 or the web portal 125. The web portal 125 provides access to media assets associated with those incidents and included in those reports.

The cloud server storage system 115 receives the certified media along with any other relevant data from the mobile device 105 through the Internet or through a local area network/Intranet. Data relevant to the certified media may include, for example, a title describing the certified media, type of media (e.g., "visual, 3D, IR, Time-Lapse, Slow Motion, Square, Panoramic, Lidar"), a group (e.g., "front property"), a note, a timestamp and date of capture, directional and location data, additional sensor data, and a note or description. This information is then made accessible by the cloud server storage system 115 to a user computing device 120 via a web portal 125 through the Internet or through a local area network/Intranet.

The user computing device 120 may be any computing device. The user computing device 120 may be the mobile device 105 or may be a different computing device.

Figure 2:
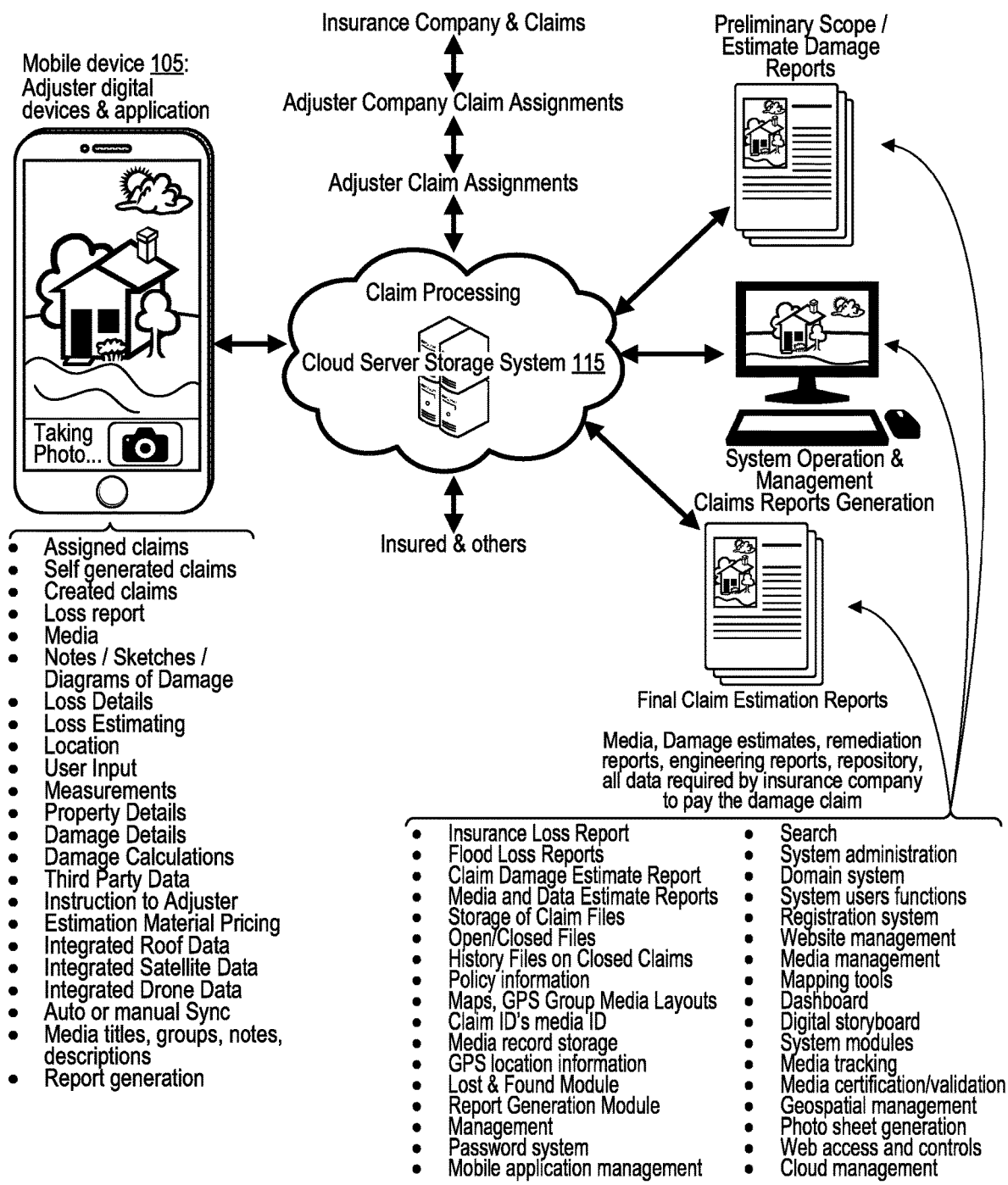
FIG. 2 illustrates secure synchronization using the cloud server storage system in the context of digital media concerning an insurance claim.

FIG. 2 illustrates secure synchronization using the cloud server storage system in the context of digital media concerning an insurance claim.

Incident and media and data capture system and methods with bi-directional cloud compatible digital output, comprising of mobile digital devices with lens, shutter, application code and data capable cellular, transceiver or wireless cloud connectivity. The system is a fully cloud centralize system, or it can converge platforms to be used with a single computer or transceiver equipped digital camera. This multi-disciplinary collection and processing system allows for quick recognition action and processing and vital media and data recording preservation/storage of unalterable, irrefutable media, reports and documents. The system will process any type of incidents, insurance, flood claims, catastrophe events, accidents, law enforcement events much more rapidly than any other system. The system will produce claim loss reports with certified media with media titles, labels, captions, notes, groups all with precision GPS information all integrated into a PDF or other computer format for increased efficiency in performing an adjuster on-site claims loss report. Additional key elements of the system include a fully integrated documentation and dynamic visual GPS enabled title, categorized, descriptive media dialog/notes integrated multimedia report generation system incorporating a programmable estimating system with preservation features.

Additional features integrated to the system are dynamic sketching tools to allow users to draw/sketch a property detail with measurement as an adjuster generates an on-site damage reports and adds Incident titles, it's category and voice to text, dynamic forms for data block inputs or keyboard entered comments along with the incident's media and subsequent media details including media title, media group(s), media description is fully integrated into the web dynamic report assembling process and into the reports when the reports function is activated, and a report is generated, saved as an example in PDF format and sent/transmitted via text, SMS, email or added to an assemblage of a larger report.

This capability includes a media, data, audio transcription and report processing center (photo sheet development system) where media groups are sorted, rearranged and organized by user controls by groups, by media along or with each singular media, its geospatial data and media title/notes/description and groups.

Additionally, the system can utilize digital processing of the media to determine damages and create loss and replacement estimates which is data that can be extracted from the media. Measurement of details includes walls, basements, floors, roofs, eves, roof damage by hail, wind or tornado etc.

The system uses secure system log-in by users. As the user receives claims to adjust, the adjuster will log into the system using his system credentials. The user management i.e. system manager will manage all users though a password system with permissions of groups of users, or individual users. The media data, loss data, contents data, adjuster labor for the onsite loss investigation data is all integrated and processed with the continually updated cost estimating portion of the system to provide all parties involved in the loss; insured, adjuster, adjuster company, insurance company an insurance estimate along with the media, loss report, documents, witness statements, prior media taken during the event, policy information, purchase receipts, owner verification data, adjuster credentials, advance payment forms, engineering reports and any other document to prove the validity of the claim including any past damages associated with the claim. All this data including the final estimate are preserved into the cloud system and stored with access provided though the secure, password system, user management, dashboard, third party data access and all associated APIs (Advanced Programming Interfaces).

All claims/incident data is associated with 3D media and GPS precision location, using modern cellular device, cellular antenna systems, RTK, GPS L5 signals to provide precise geographic location, land features, rivers, streams, roads, bridges, buildings, topographic data etc. The system will utilize the gps claims data to integrate into computer generated maps such as Google Earth, Digital Globe or other sources of satellite data. This data is also integrated into the digital device system in real-time if required.

That is that the adjuster can capture media of the property while at the same time download remote satellite image data from a satellite or other $3^{rd}$ party suppliers to incorporate roof damage, solar panels, i.e. hail, wind, tornado, wildfire, earthquake etc., associated with a particular event, incident or claim. The precision gps and media processing of both the satellite data and adjuster collected data can form an extremely precise map of for example hail damage location on a roof and show individual hail damage per shingle while indicating depth of the damage, percentage of damaged area, replacement costs to remove damage and replace to original condition. The system includes a claim configuration integrated software process which can configure the claim by type dynamically, i.e. fire, flood, accident, storms, earthquake, hurricane so the adjuster has access to multiple tools necessary to perform measurements, collect media, facts, in which to create loss and damage estimate reports for distinctly different types of events all using the same system.

The system also has a dynamic function to create both assigned claims versus created claims. Assigned claims are where the adjuster would have limited ability to modify the claim data, media or loss data. The Created claim would allow the owner/creator to manage everything about the claim and to manage all aspects of the claim with edit functions to edit the whole claim's data, media, estimate, loss forms, loss data, etc. The system can function as an integrated insurance, insurance claims system for providers, insurance adjuster firms or adjusters where insurance claims are digitally provided over the network to all parties for processing allowing the choice of or not of total transparency to the insurance company, claims company, adjuster, insured and if required the government if it is a government back NFIP flood claim. The system provides domain security, initiation and separation, so data is not compromised. The claims assigned can be assigned to a particular adjuster and can be assigned automatically in specific groups or in a mass intelligent assignment process. The digital device receives assignments through a preprogrammed or manual synchronization. Menus are provided to service the adjuster on his digital device for workflow and visual or audio status indicator of all claims such as new, in process, waiting for follow up, completed, waiting for approval etc. This allows the transaction thought the use of fill-in prompts, voice prompts, tone prompts for data and media collected on site of loss or capturing media of the insured individual home contents such as furniture or valuables with labels indicating value, age, and condition with a summing of the value.

The real-time GNSS (e.g., GPS) and media capture system plays a role in both being part of the media and by indicating the current location of the adjuster doing the work. The GPS allows anyone having access to the system to view the, time, location and travel path of collected media to determine the real-time adjuster location, time on job, time spent doing the damage assessment, and time to complete the overall damage inspection and estimate. The system features allow for scheduling adjusters with insured to complete their damage inspection and insured to communicate, make schedules, appointments electronically, and through other means, such as internet, mobile app interface, or via text, or email all with confirmations sent to confirm the time, in route and confirmation when on-site and ready to begin the property adjustment. Other technologies including certified real-time video, certified streaming video with gps and other attributes called out in this document will also be part of the video whether one way or two-way real-time video communication. The system additionally will also accept the standard Apple Computer's Facetime or Skype system and any commercial supplier of video conferencing, or internet meeting system such as Go to Meeting as a usable plug in to make the video or computer connection for real time customer communications. Certified digital photos, video, and audio can be captured/shared/transferred/stored between the parties during a real-time video teleconference connection meeting.

Further, the digital device with application code, reviews an insurance claim assigned to the claims adjuster on the digital device. There are certain steps required to adjust property for an insurance claim of any kind. The system will perform the actions required with the selected type of insurance claim. The digital device is capable of capturing 3D media with centimeter accurate precision gps location and gps media and data and documenting the property loss/damage and recording that data and integrating all into a report for insurance claim validation and proof of the loss which validates the carrier to payment.

Claims are maintained in a repository with all communications, claim records, documents, media, gps data, communications, initial notice of loss communication notes, engineering reports, policy data, advance payments records, property data, prior property loss records, contents, audit records, and required business processes. The system completes multiple claims assignments and produces the documents for different insurance carriers simultaneously using hierarchical domain computer software and password controls with a super management user with all data synchronized between the mobile device and the cloud system. The system allows for hundreds of mobile device users to be connected to various different domains simultaneously transmitting, syncing between the digital device and cloud system. The system will accept digital images, audio recording, video in multiple resolutions, digital policy information, word processor documents, spreadsheets, etc. The system has multiple drop-down menus, drop down lists and drop downs, that create a secondary drop-down list as cited in the tracking features shown in the displayed layer section. The system also allows the user to select various measurement features, such as conversion from fractions to decimal, form from feet to yards, etc. Measurement can be made using media embedded software solutions to use the media to measure in the media or process outside of the media. The measurement system can all utilize the digital device's onboard GPS system integrated with the media system to complete measurement of items in the digital media. The user can create 3D reference points in the media and draw lines with finger or user tools to fix a point in the image and draw lines, circles, squares, reference points, boxes to create measurements, as well as use integrated tools associated with measurement to calculate the areas, length, widths, volume, square feet etc., of the damage along with their replacement values as the data will be associated with the damage estimation of the loss whereby the loss damage report information is integrated and completed, stored, delivered.

There is a method for validating and authenticating the user of the portable device based on the registration and/or profile information of the user by the system management administration process and user.

The system's mobile application code (uploaded Incident Media Capture System) allows establishment and incident initiation process. The incident titles, incident categorizing, insertion of comments, storage, transmission and provides for system synchronization of the mobile device to cloud and the cloud web portal and to the mobile devices. All incidents and incident media and associated data i.e., titles, categories, comments etc., are synchronized end to end with the entirety of associated data and group incident's media captured, using its user screen selectable multiple media capture source.

Figure 3:
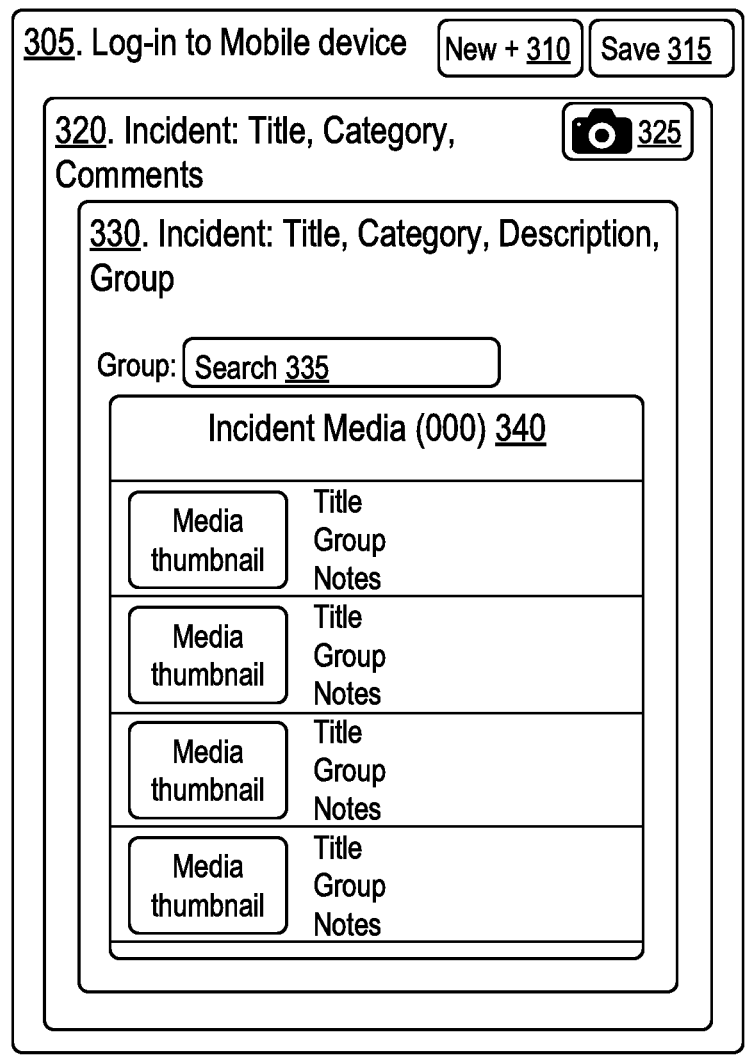
FIG. 3 illustrates stacked interfaces corresponding to an incident and incident media capture process.

FIG. 3 illustrates stacked interfaces corresponding to an incident and incident media capture process.

The user logs in to the mobile device 105 via interface 305, can create a new incident via "new +" button 310, and can save this incident via "save" button 315.

The user then inputs a title, category, and comments for the incident via interface 320. The user can add photographic media via a photo button 325. The Camera icon button expands to open and expose the camera screen and operator selectable controls and features. Some of these are select mode, photo, video, audio. Additionally, photo capture features and operational modes such as groups, general, standard, new, reports which are user selectable providing media location. Voice operational camera trigger is included as an additional mode for fingerless capture operation/ process by using voice activation to capture photo, video, and audio.

Once the incident is created via the interface of step 320 and the user saves via save button 325, an incident view interface 330 is opened, showing an incident media list 340 with a number of incident media assets (here, four)— showing the media thumbnails, titles, groups, and notes corresponding to each media asset. These are certified media assets, meaning they got through the verification/certification process after being selected by the user and before being associated with the incident media list 340 of the incident viewed via incident view interface 330. The incident view interface 330 also includes a search bar 335, which can be used to search for a particular incident, group, word, and media asset in the incident media list 340. Alternately or additionally, the search bar 335 can be used to search for a different incident.

Users capture media in each incident along with recorded material about that incident with scripted aspects regarding each media. Each media contains internally code processed certified media, instantaneously at time of acquisition along with user inserted media titles, media group, media notes/ description, and other media attributes, all electronically integrated.

The system maintains a continuous media chain of custody, from the instant the on-screen camera media trigger or activated selectable voice activated capture (system has a separate on-screen camera trigger control due to having a separate camera controller) is activated, media is captured and continues throughout the entire transmission process and for the total time the certified media and associated data is preserved in the cloud and web portal system.

Figure 4:
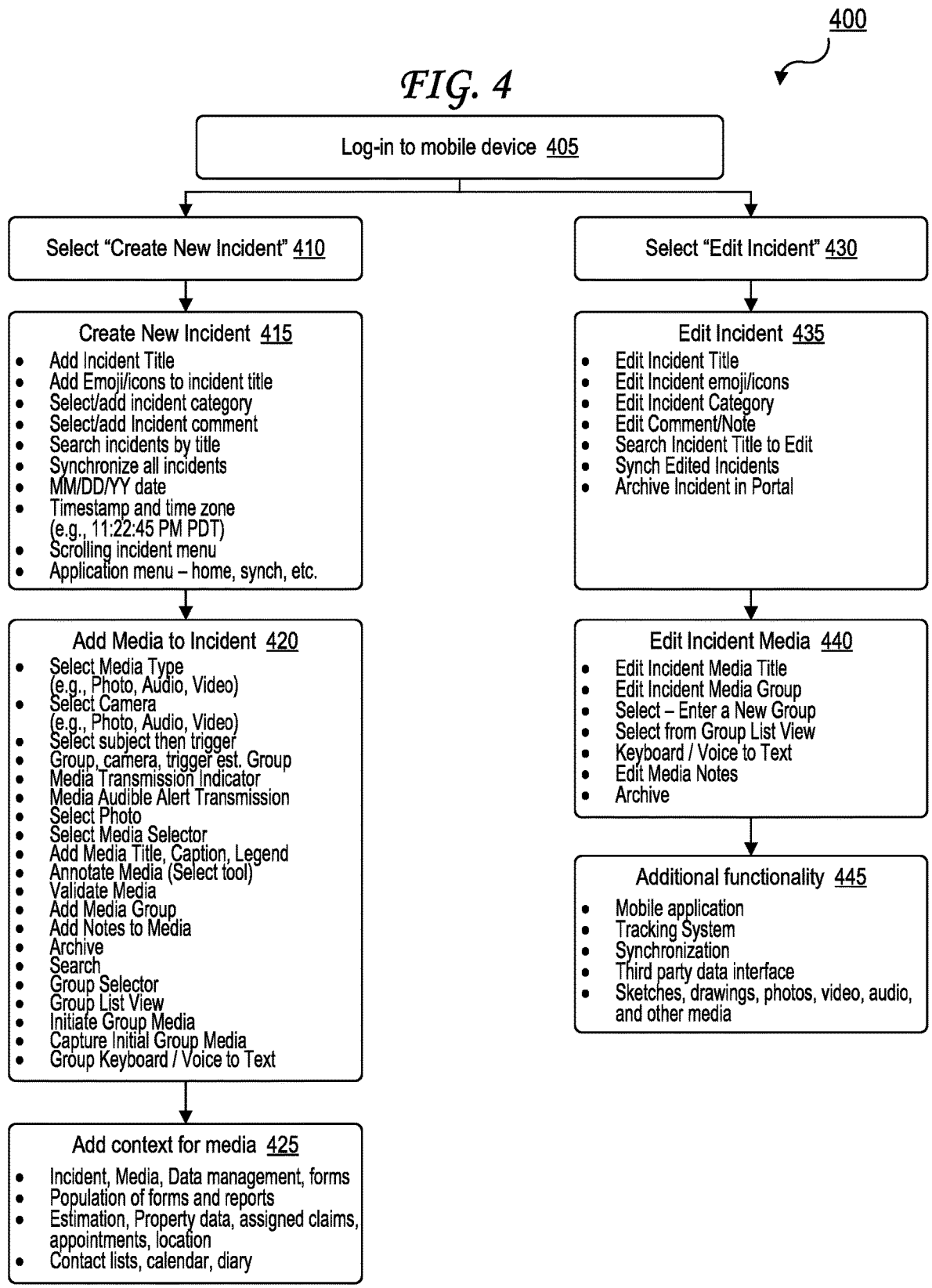
FIG. 4 is a flow diagram illustrating procedures for creating a new incident record and for editing an existing incident record.

FIG. 4 is a flow diagram illustrating procedures for creating a new incident record and for editing an existing incident record.

At step 405, the user logs in to the mobile device 105.

At step 410, the user selects "Create New Incident." New incident creation provides a number of possible processes at step 415, including adding incident title, adding emoji/icons to incident title, selecting/adding incident category, selecting/adding incident comment, searching incidents by title, synchronizing all incidents, adding MM/DD/YYYY date, adding timestamp and time zone (e.g., 11:22:45 PM Pacific Time), scrolling incident menu, and viewing application menu (home, synch, etc.).

At step 420, the user adds media to the incident. Adding media provides a number of possible processes, including selecting media type (e.g., photo, audio, video), selecting camera (e.g., photo, audio, video (including various selectable media resolutions and flash)), selecting subject then trigger, grouping, camera, trigger est. group, media transmission indicator, media audible alert transmission, selecting photo, selecting media selector, adding media title, caption, legend, annotate media (select tool), validating media, adding notes to media, adding media groups, archiving, searching, group selector, group list view, initiating group media, capturing initial group media, and group keyboard/voice to text.

At step 425, additional context can be added to the media, including incident, media, data management, forms; population of forms and reports; estimation, property data, assigned claims, appointments, location; contact lists, calendar, diary and secure electronic signatures with date and time along with printed name inserted into certain forms, title etc.

At step 430, the user selects "Edit Incident." Incident editing provides a number of possible processes at step 435, including editing the incident title, editing the incident emoji/icons, editing the incident category, editing the comment/note, searching the incident title and to validate a media, by user selecting the square with up arrow located in top left of screen when upon selection a validation screen appears to indicate certified or non-certified depending on the selecting and initiating the validation process, edit, add identifier, synching the edited incidents, and archiving the incident in the web portal.

At step 440, the user edits media for the incident. Editing media provides a number of possible processes, including editing incident media title, editing incident media group, search, selecting "enter a new group," selecting from group list view, editing text via keyboard/voice to text, editing media notes, selecting and moving media from one group to another, and archiving the media (e.g., in the web portal).

At step 445, additional functionality is listed, including mobile application, tracking system, synchronization, third party data interface, sketches, drawings, photos, video, audio, and other media.

Figure 5A:
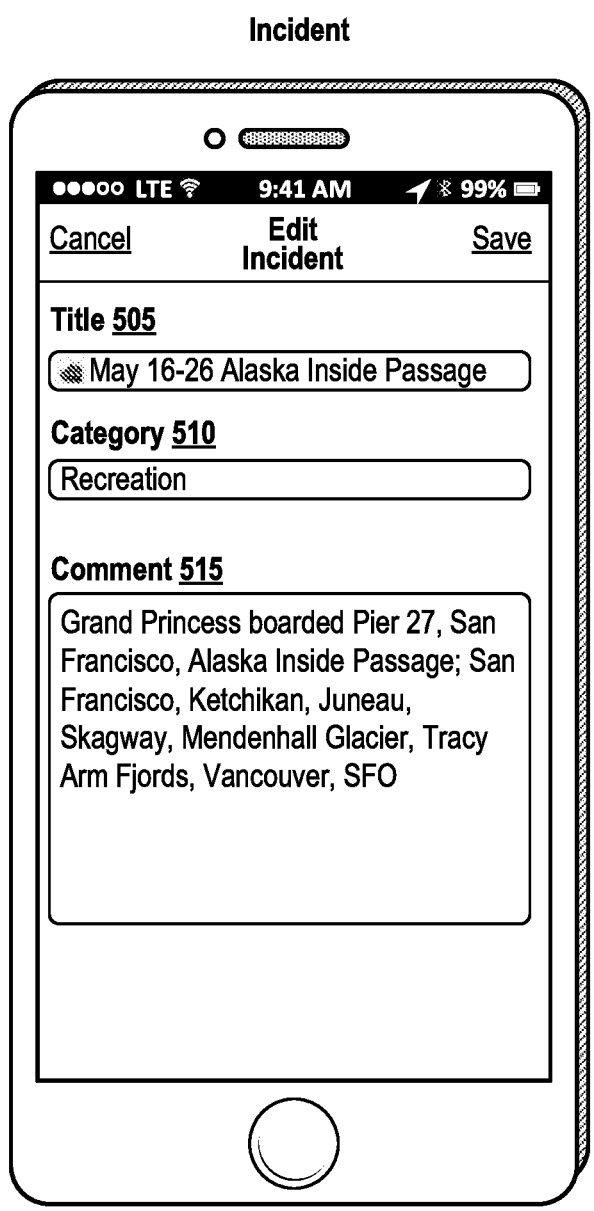
FIG. 5A illustrates a user interface for creating or editing a title, category, or comment for an entire incident.

FIG. 5A illustrates a user interface for creating or editing a title, category, or comment for an entire incident.

The user interface of FIG. 5A is an example of the interface 320 of FIG. 3 and of the process operations 415 and 435 of FIG. 4. In particular, the while the interface of FIG. 5A is an "edit incident" interface as in step 435 of FIG. 4, it should be understood that a "create new incident" interface as in step 415 of FIG. 4 may look the same or similar.

In particular, the interface of FIG. 5A includes a title input form 505, which is filled out with a boat icon/emoji as well as the text "May 16-26 Alaska Inside Passage." The interface of FIG. 5A also includes a category input form 510, which is filled out with the text "Recreation." The interface of FIG. 5A also includes a comment input form 515, which is filled out with the text "Grand Princess boarded Pier 27, San Francisco, Alaska Inside Passage; San Francisco, Ketchikan, Juneau, Skagway, Mendenhall Glacier, Tracy Arm Fjords, Vancouver, SFO."

Figure 5B:
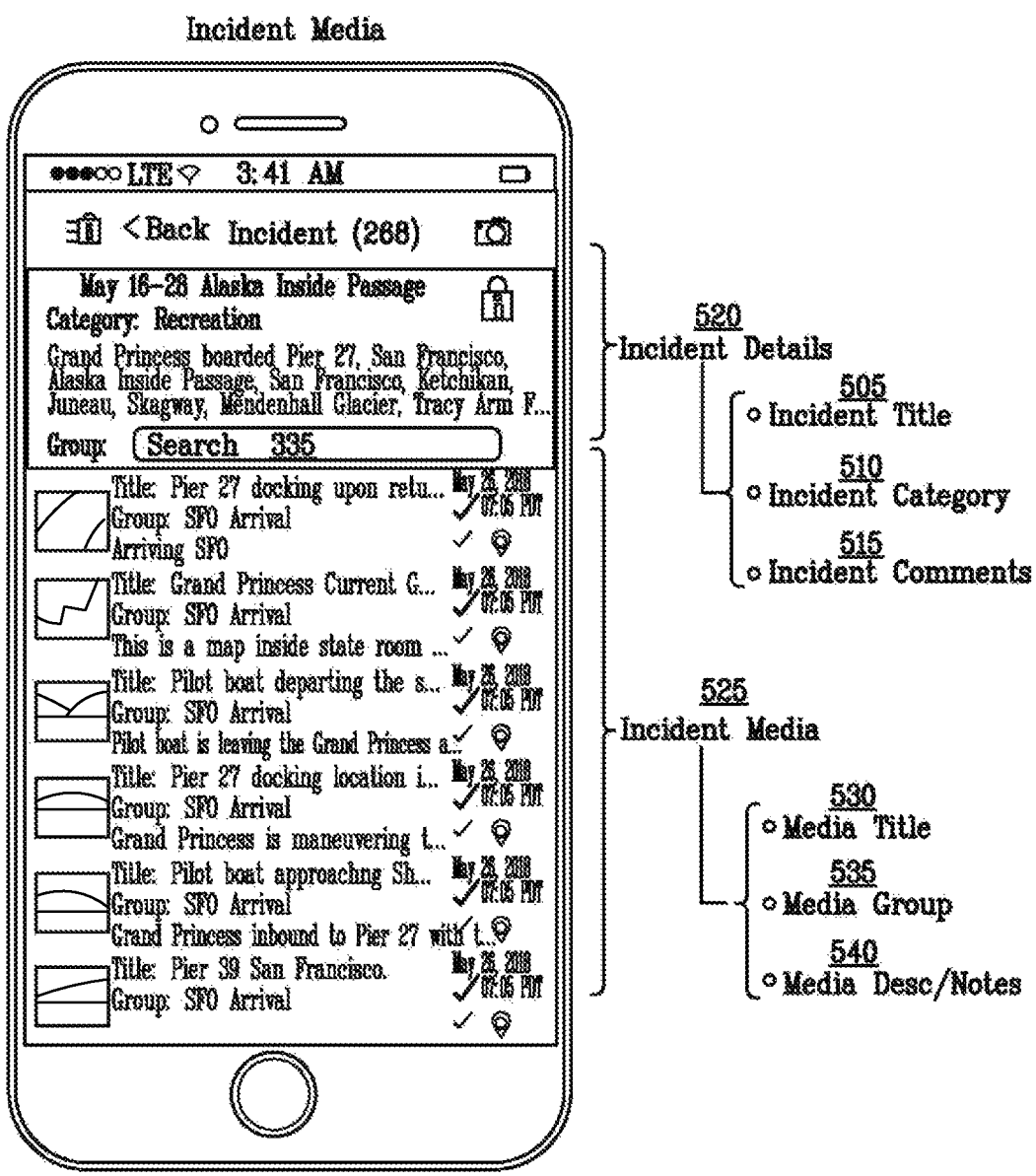
FIG. 5B illustrates a user interface for viewing and searching through incident details for an entire incident or for any of a set of incident media items corresponding to the incident.

FIG. 5B illustrates a user interface for viewing and searching through incident details for an entire incident or for any of a set of incident media items corresponding to the incident.

The user interface of FIG. 5B is an example of the interface 330 of FIG. 3 and of the process operations 415/425 and 435/440 of FIG. 4. The interface of FIG. 5B includes incident details 520, which include the incident title 505, incident category 510, and incident comments 515 from FIG. 5A. The incident details 520 also include the search bar 335 described in FIG. 3.

The interface of FIG. 5B also includes incident media details 525 for each listed media asset, including a media title 505, a media group 535 (all of the media assets visible in FIG. 5B are in the "SFO Arrival" group), and media descriptions/notes 540.

Figure 5C:
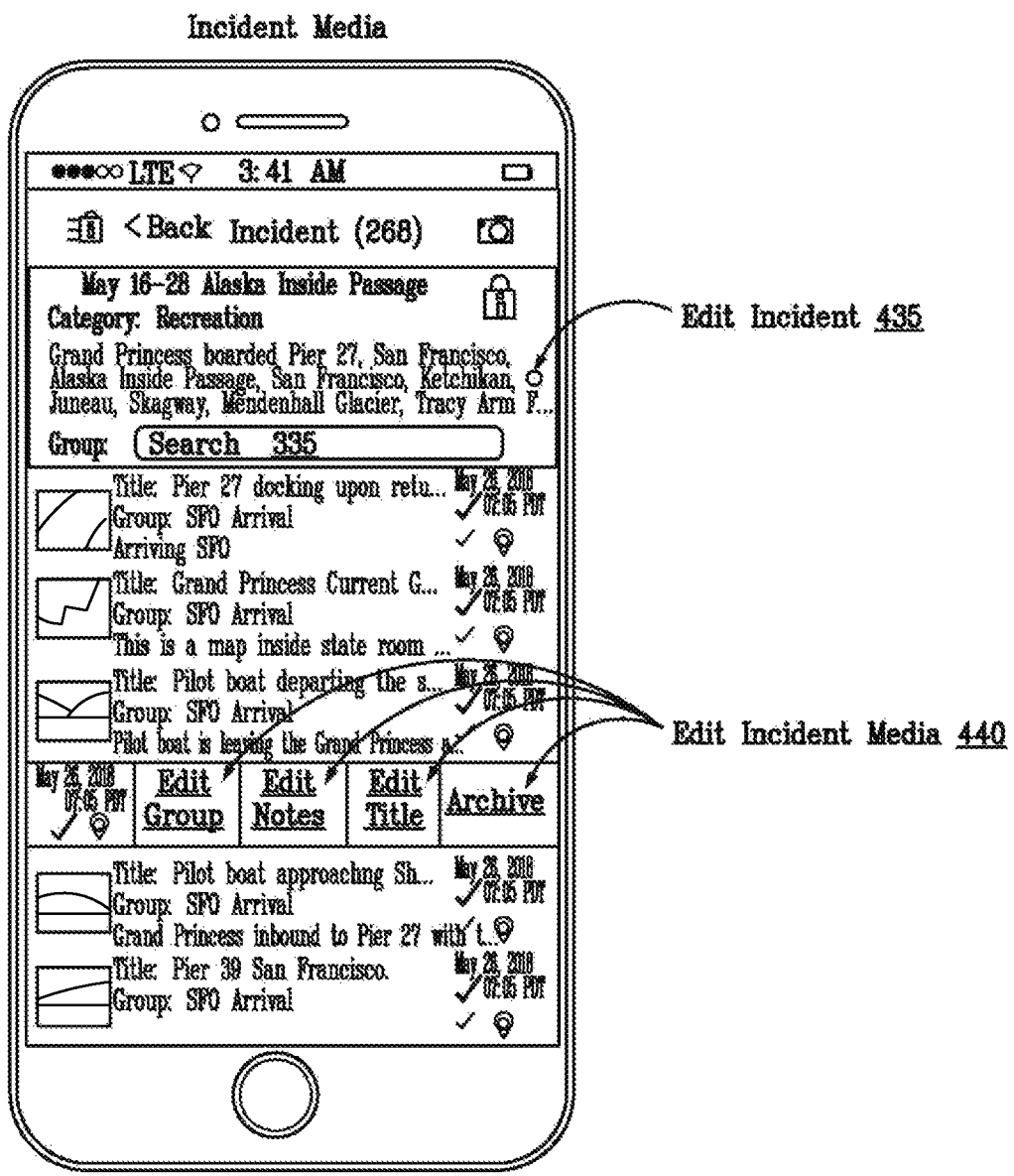
FIG. 5C illustrates a user interface for editing incident details for an entire incident or for any of a set of incident media items corresponding to the incident.

FIG. 5C illustrates a user interface for editing incident details for an entire incident or for any of a set of incident media items corresponding to the incident.

The user interface of FIG. 5C is the user interface of FIG. 5B, but with certain editing functions activated. That is, one of the media items identifying a media asset and its corresponding incident media details 525 (title 530, group 535, description/notes 540) are swiped to the left via the touchscreen of the mobile device 105 to reveal four buttons for editing the incident media 440. These four buttons read "edit group" for editing the group 535, "edit notes" for editing the description/notes 540, "edit title" for editing the title 530, and "archive" for archiving the media asset.

An "edit incident" button 435 is also present, which when pressed, takes the user back to the interface of FIG. 5A, allowing the user to edit the incident details 520.

Figure 6:
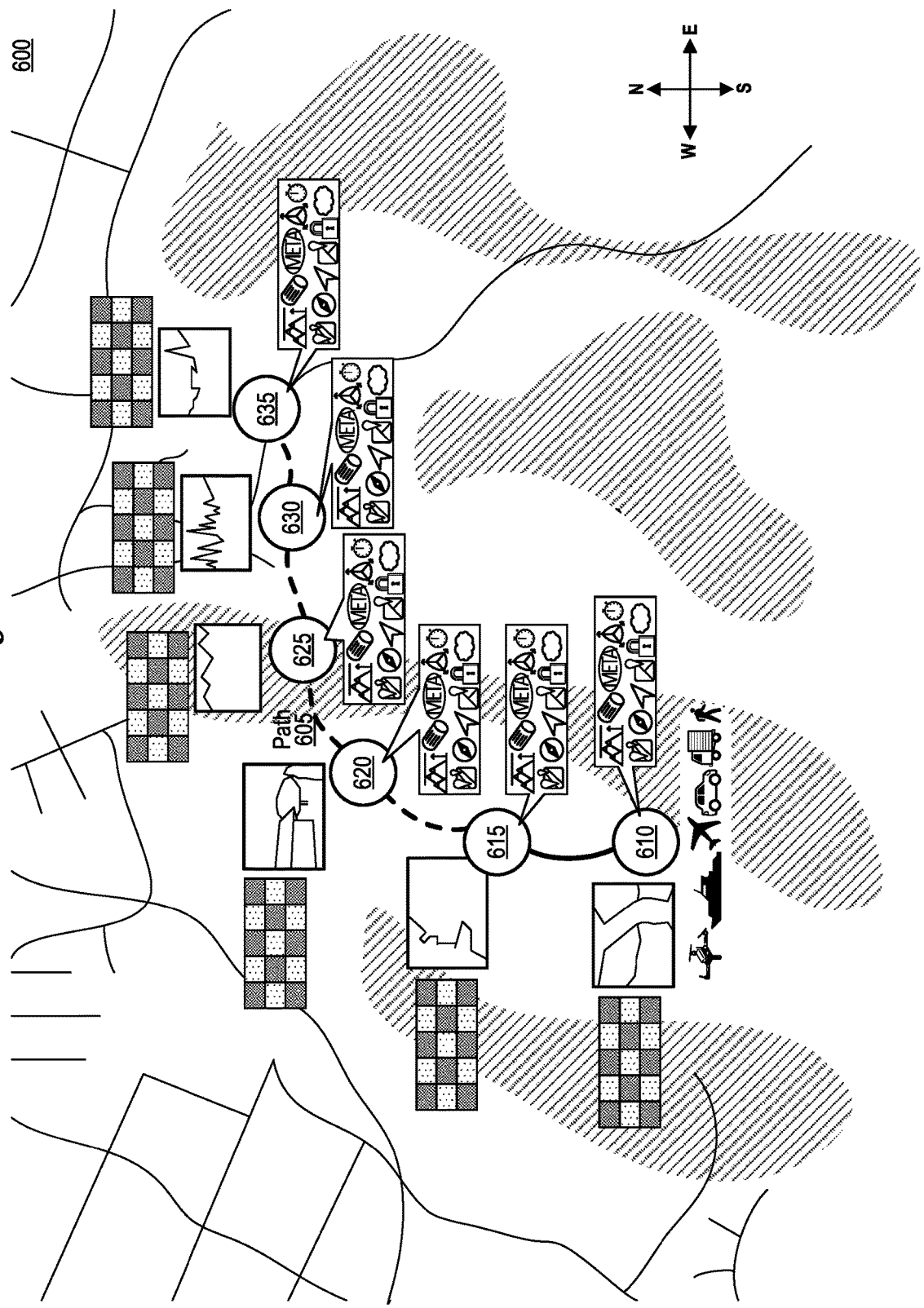
FIG. 6 illustrates a topographical map tracking locations, directions, altitudes, and sensor data corresponding to media captured at different points along a route.

FIG. 6 illustrates a topographical map tracking locations, directions, altitudes, sensor data, and directional data corresponding to media captured at different points along a route.

In particular, a path 605 is illustrated overlaid over the map 600 of FIG. 6. The path 605 includes a first location 610 associated with a timestamp reading 12:01:01 PM, a second location 615 associated with a timestamp reading 12:05:16 PM, a third location 620 associated with a timestamp reading 12:09:32 PM, a fourth location 625 associated with a timestamp reading 12:11:56 PM, a fifth location 630 associated with a timestamp reading 12:12:15 PM, and a sixth location 635 associated with a timestamp reading 12:14:27 PM.

The path 605 represents a path of travel of a media capture device through a mountainous region, the media capture device capturing various media assets at each location along the path. In particular, each location includes information overlaid over the map 600 representing media captured by the media capture device at that location, in particular a box with a photographic image captured by the media capture device at that location and a strip of video frames of a video captured by the media capture device at that location or a combination of each. A number of icons are also illustrated beside each location, the icons including a compass representing a direction that the media capture device is facing (and/or a compass reading of a compass of the media capture device), media capture device, an altitude indicator indicating altitude or elevation as captured by an altimeter of the media capture device, a location indicator indicating GNSS geolocation or other geolocation data captured via one or more positioning receivers off the media capture device, a metadata icon representing image and video metadata captured by the media capture device, a timer icon representing a time of capture and/or a duration of capture (e.g., for a video), a lens icon indicating media capture settings (e.g., aperture, ISO, exposure time, gain), a certification icon indicating certification of the media and other data collected by the media capture device as discussed with respect to FIG. 13, a cloud icon reflecting synchronization with servers 115 and/or other user computing devices 120 as discussed with respect to FIG. 1 and FIG. 2, a map icon reflecting map data that can optionally be pulled from internet-accessible map information databases or other sources and optionally including satellite or aerial or street-view photography from such sources, and an tri-arrow and angle icon representing pitch and roll and yaw captured by the media capture device.

The media capture system will maintain collected media and associated media data information if operated off grid in a non-cellular signal or WI FI service area. Once signal is detected, the media capture system will automatically (or by manual process) upload media and associated information to the cloud. If any data issues are indicated, the upload signal is shown. The user, at any time, can complete a system synchronization, and all data will be synchronized across both the cloud and on the digital device within or outside a domain structure. This includes the (a.) INCIDENT title, category, comments/notes. This also includes the (b.) MEDIA title, group, group title description, location, time, date, heading, altitude, GPS, certification, cloud confirmation, metadata, device type, device model, device user. The media capture system will track information regarding each media showing the start initiation media time, location, look angle, orientation, compass heading, stop time, movement time to next media capture, next media capture, acceleration, velocity/acceleration, time from last capture to the latest capture, and continuing data tracking until final capture is completed. Further, it will generate a map of the data collected and storing both the data and map in the system. All of this data is transmitted to the cloud and synchronized as well during the collection process. Using RTK signals from suppliers of those type of signals and others who generated corrections to standard GPS signals, the media capture system will also include the ability to utilize miniature GPS receivers and produce a precise centimeter accuracy incorporated into the media metadata of anywhere on the earth, underwater or in space. This media accuracy collection and transmitted within the system to the cloud for more precise media tracking and media précises elevation reporting. The map 600 of FIG. 6 is an example of a topography map with a path 605 having a starting point 610. A media capture device is shown at point 610 at a time, location, pointing angle of the lens, elevation, compass heading, 3-axis orientation of the lens, capturing a media. The system then moves to point 615. From point 610 to point 615, the time, velocity, elevation, acceleration, compass heading, lens's look angle, map location, metadata, media certification, are all processed to determine the outcome and transmitted to the cloud. The system then continues on to 620, 625, 630, and on to 635, which is the end of the path 605. The system which can be integrated directly as a stand-alone digital device or into a standard digital camera, 3D camera or, any type of autonomous vehicle camera system, auto/truck dashcam, police body camera, aircraft portable or fixed camera system, UAV camera, UAV dashcam, helicopter, boat, attached to delivery driver such as Amazon, FedEx, United Parcel Post, US Post office, or Uber, Lyft dash camera systems motorcycle or drone.

FIG. 7 is a table illustrating metadata for three digital media assets captured at different times.

In particular, FIG. 7 is an example metadata that can be captured by the media capture device alongside capture of media assets, for example along a path such as the path 605 of FIG. 6. The metadata may include timestamp and location data associated with each media asset (i.e., each image, video, and/or audio recording captured by the media capture device) as illustrated in FIG. 6. The metadata for each location, timestamp, and media asset may also include additional information, such as the information identified in the table 700 of FIG. 7, including Media identifier (ID) 705 of the media asset, media asset Title 710, Group 715 that the media asset is in (and optionally title of the group), Location 725 (optionally including elevation), orientation 730 (including roll, pitch, and/or yaw), direction (of movement or of capture) and optionally acceleration in the direction (or in any other direction) 735, distance and/or time and/or elevation and/or direction since last capture 740, user identifier (ID) 745, device model and type 750, angle that the media capture device is facing 755 (in degrees from a defined direction such as north or east or west or south) during capture of the media asset, media type 760 (e.g., image, 3D, video, audio, RADAR, LIDAR, SONAR/SODAR), a distance and/or bearing to a target object that is depicted in the media asset 765, order of location within the set of locations in the path 770, and additional mapping data 775 such as digital elevation model mapping. Additional metadata may also include Direction Traveled and Dwell time at a particular point. The metadata illustrated in the table 700 that relates to motion, direction, and orientation may be determined coupling one or more inertial measurement units (IMUs), one or more accelerometers, one or more gyroscopes, one or more positioning receivers (GNSS and/or otherwise), or some combination thereof. Metadata may then be incorporated into charts or graphs, reports and may be overlaid over maps such as the map 600 of FIG. 6.

Figure 8:
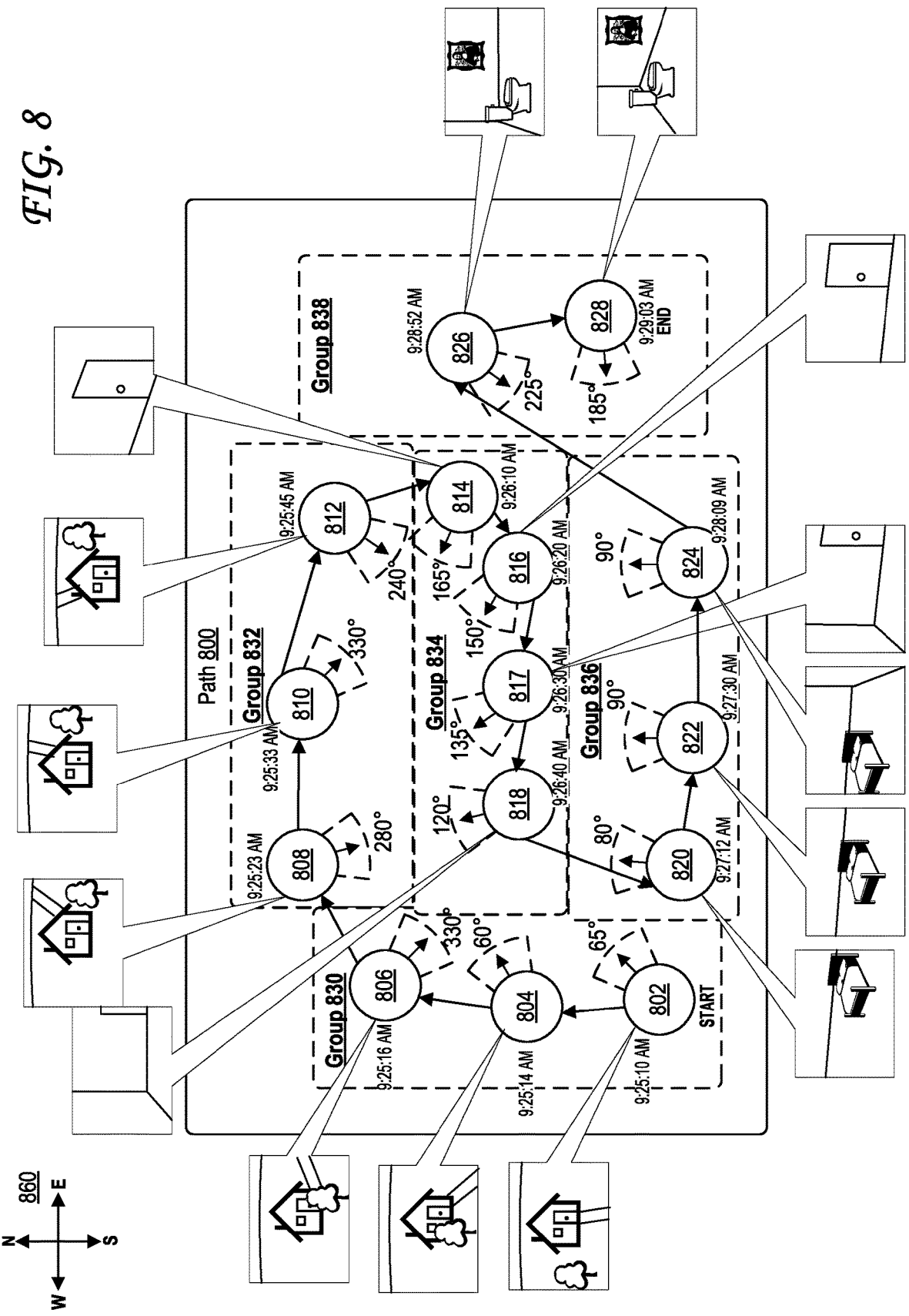
FIG. 8 illustrates application of directional and location tracking alongside media capture using sensors on or connected to the mobile device and algorithms run on the mobile device and/or on a cloud server.

FIG. 8 illustrates application of directional and location tracking alongside media capture using sensors on or connected to the mobile device and algorithms run on the mobile device and/or on a cloud server.

In particular, FIG. 8 is an example of path 800 of a media capture device from a start point 802 to an end point 828, with media captured at various times and locations along that path. The media capture device captures a media asset at location 802 at 65 degrees at 9:25:10 AM (the start point), then moves to location 804 and captures media at 60 degrees 9:25:14 AM, then captures a media asset at location 806 at 330 degrees at 9:25:16 AM, with these three captures (802, 804, 806) being in a first group 830. The media capture device then captures a media asset at location 808 at 280 degrees at 9:25:23 AM, then moves to location 810 and captures media at 330 degrees at 9:25:33 AM, then captures a media asset at location 812 at 240 degrees at 9:25:45 AM, with these three captures (808, 810, 812) being in a second group 832. The media capture device then captures a media asset at location 814 at 165 degrees at 9:26:10 AM, then moves to location 816 and captures media at 150 degrees at 9:26:20 AM, then captures a media asset at location 816 at 135 degrees at 9:26:30 AM, then captures a media asset at location 818 at 120 degrees at 9:26:40 AM, with these four captures (814, 816, 817, 818) being in a third group 834. The media capture device then captures a media asset at location 820 at 80 degrees at 9:27:12 AM, then moves to location 822 and captures media at 90 degrees at 9:27:30 AM, then captures a media asset at location 824 at 90 degrees at 9:28:09 AM, with these three captures (820, 822, 824) being in a fourth group 836. The media capture device then captures a media asset at location 826 at 225 degrees at 9:28:52 AM, then moves to location 828 and captures a final media asset of the path 800 at 185 degrees at 9:29:03 AM, with these two captures (826, 828) being in a fifth group 838. The path 800 is illustrated from a top-down view, with the locations plotted along latitude and longitude, with a compass 860 showing relative direction within the path 800. Direction of the media capture device during capture of each media asset (e.g., image, video, audio) is also captured and shown along the path 800 via the arrow and field of view indicator extending from the circle.

Images representing the media captured at each location and timestamp illustrated along the path 800 (and described above) are shown in callout boxes extending from each location along the path 800. In particular, the locations illustrated in the first group 830 and second group 832 represent locations outside of a building, and the corresponding images are illustrated showing the exterior of the building from different angles representing the view of the building from those locations. The locations illustrated in the third group 834, the fourth group 836, and the fifth group 838 represent locations inside of the building, and the corresponding images are illustrated showing various portions and angles within the interior of the building, with the images of the third group 834 showing a first room (an entrance room), the images of the fourth group 836 showing a second room (a bedroom), and the images of the fifth group 838 showing a third room (a bathroom).

In some cases, additional data may be collected by the media capture device, such as location, elevation, altitude, velocity, speed, roll, pitch, and yaw. Velocity or speed may alternately be calculated, for example based on the various locations and associated timestamps along the path 800. Distances between the different locations of the path 800 may be determined after or during movement of the media capture device along the path 800. In some uses, a predetermined location may be established. For example, collecting 3D certified images allows those to be directly inserted into CAD program to produce a 3D model of the house.

Ultimately, all of the media asset data, and related metadata concerning location of the media capture device during capture, timestamp corresponding to time of capture, direction that the media capture device is facing during capture, is then transmitted to the cloud as discussed with respect to FIG. 1 and FIG. 2, and analyses can be generated. The analysis may include a path such as the path 800 shown in FIG. 8, which may be generated after the media assets and metadata are all captured to align media assets and directional data to the path at the various locations, which are arranged into the path 800 based on the timestamps corresponding to the locations. In some cases, altitude or elevation data (or any other metadata as discussed with respect to the table 700) may be aligned to the path beside a particular location and media asset to which that particular data pertains. In some cases, metadata may be represented using colors along a color spectrum coloring a dot/circle/point/shape/icon representing a particular location. For example, if the metadata represented by color is altitude, red may represent sea level (or another lowest level of altitude in a range), orange may represent a higher altitude, yellow may represent a still higher altitude, green may represent a still higher altitude, turquoise may represent a still higher altitude, blue may represent a still higher altitude, indigo may represent a still higher altitude, and violet may represent a highest altitude in a range. The analysis may also include analyses such as the analyses 900 illustrated in FIG. 9 and included in the report of FIG. 10. Certified media captured from the media capture device, which may be a 3D camera, from known locations/positions can be inserted into CAD software to generate 3D view of damage to roofs, exteriors, interiors, etc., and converted into insurance reports to document damage along with mapping location of inspector traveling around a property.

FIG. 9 illustrates an interface with multiple types of media asset and metadata analyses, including mapping of media assets and metadata, focused analyses, and elevation analyses.

In particular, FIG. 9 provides an interface 900 with three analyses—a map interface 910 that plots multiple media assets and corresponding metadata on a satellite view map, a focused analysis 920 that focuses on a particular media asset and related metadata, and an elevation analysis 930 that plots elevation. The map 910 shows multiple certified media assets at captured different locations that are close to one another, with a particular media asset 915 highlighted with a callout box. The media asset 915 is a photo captured on Jul. 12, 2016 at 11:02:16 AM at latitude 37.65127716 and longitude −121.85468246, with a media asset ID of MDI2016467029. An address in the corner of the map 910 identifies that the map 910 is centered around 341 Dove Drive, 94566 USA.

A focused analysis 920 focuses on a particular location or area with an address of 341 Dove Drive, 94566 USA that is a target of one or more media assets captured around a particular location and time. Metadata is presented in the focus analysis 920, including a job number (416812) associated with capture of the media assets, a GNSS point associated with a center of the property (GPS address property center point), an identifier of a closest fiduciary survey marker (Bingo 38), an identifier of a nearest cellular tower (87654 at bearing 330 degrees), a nearest cross street (Dove Drive and Grant Court), and a nearest Wi-Fi source (network Xfinity 663). A mini-map is also illustrated showing the relative positions of a cellular antenna 1.812 miles away at 286 degrees, a fiduciary survey point 1.765 miles away at 330 degrees, a nearby fault line that is 2.3 miles away at 120 degrees, and a nearby river water hazard that is 2.8 miles away at 245 degrees.

The elevation analysis 930 illustrates elevations at which various media assets were captured relative to a base elevation of 620 feet. The media assets are arranged from left to right in the order they were captured. The media assets include a first media asset 942 captured at elevation 619 feet and 0.5 inches with the media capture device facing an angle of 65 degrees, a second media asset 944 captured 360 degrees away from the first media asset 942 at elevation 616 feet with the media capture device facing an angle of 60 degrees, a third media asset 946 captured 10 degrees away from the second media asset 944 at elevation 619 feet with the media capture device facing an angle of 120 degrees, a fourth media asset 948 captured 50 degrees away from the third media asset 946 at elevation 618 feet with the media capture device facing an angle of 165 degrees, a fifth media asset 950 captured 88 degrees away from the fourth media asset 948 at elevation 618 feet and 30 inches with the media capture device facing an angle of 120 degrees, a sixth media asset 952 captured 91 degrees away from the fifth media asset 950 at elevation 618 feet and 10 inches with the media capture device facing an angle of 210 degrees, a seventh media asset 954 captured 115 degrees away from the sixth media asset 952 at elevation 619 feet with the media capture device facing an angle of 240 degrees, and a final eighth media asset 956 captured 180 degrees away from the seventh media asset 954 at elevation 618 feet and 10 inches with the media capture device facing an angle of 0 degrees. The GPS property center lies along the path between the fourth media asset 948 and the fifth media asset 950. The distance covered between each location corresponding to each media asset is denoted with a rightward arrow regardless of direction along a latitude-longitude plane (or globe), with direction along a latitude-longitude plane (or globe) denoted instead by the angle written above the arrow. The relative distances between the locations may be denoted by the relative lengths of these arrows, so that longer arrows denote further distances between locations while shorter arrows denote shorter distances between locations. Alternately, the relative times between capture of each media asset may be denoted by the relative lengths of these arrows, so that longer arrows denote more time elapsed between capture of two media assets while shorter arrows denote less time elapsed between capture of two media assets. In some cases, the distances and/or timestamps may be included in the elevation analysis 930.

FIG. 10 illustrates an incident report generated using the analyses of FIG. 9.

The incident report 1000 includes the map analysis 910, focus analysis 920, and elevation analysis 930 of FIG. 9 as well as a media mapping path 1010, a metadata table 700, an incident description 1020, a second area map 1030, and a street view image 1040. The incident description 1020 may include, for example, incident titles, categories, descriptions, and a date and times of the incident and/or of when the report was automatically generated by the cloud server system. The incident description 1020 also identifies multiple media asset relevant to the incident and corresponding incident media titles, groups, dates of capture, timestamps of capture, authors, locations, certification statuses, media identifiers, electronic signatures and notes.

Reports may be automatically generated to include media sheets—that is, grids, lists, or other arrangements of media assets and related data. Where the media is entirely photos, these may be photo sheets. Where the media is entirely videos, these may be video sheets, for example with multiple frames of the video displayed.

Provided in this new capability is the ability to provide that technology and with the associated software to create accurate ground truth waypoints with accuracy and details never before accomplished in real time. The application exploits dead reckoning algorithms to produce a position 1 location vs a position 2 in 6-axis real time measurement including dwell times.

Machine and user insertion into the metadata regarding the concurrent captured media details and facts about each media are also processed in the digital media capture device and autoloaded at the time of capture. The media information data is editable upon capture and later editable by numerous mean of media attributes via voice or keyboard; such as Incident Title, Incident Category, Comments about an Incident. Upon saving the Incident and using the media capture system for capturing images, video or audio into the system, and saving the Incident, the Incident detail page which already contains the previously inserted Incident title, category and comments appears and shows a Group search bar along with the media thumbnails of the Incident captured media. If the group system is utilized, each media is shown in its individual identified group, and can be searched by using the group search function. Each thumbnail contains the individual media Search, Title, Group Identifier, and Media Notes along with other icons showing cloud receipt, time date, time zone, and selectable map tool when selected bring up a map of the media asset capture location and other metadata information. Media can also be transferred from group to group using the "edit group" feature. Notes may be edited by using the "edit notes" feature. Titles can be edited by using "edit title" feature.

The identical information is synchronized between the mobile device and the cloud website and vice versa. It is available to the user after logging into the secure website. A similar set of tools are available in the web portal to identify each incident and each media associated with each incident. Here is a list of some of those attributes. Each Incident includes a unique Incident ID number (generated by the mobile application code), Incident number (generated by the mobile application code), Title, Domain, Category, Location, Description, Media, Certification, Authentication, Validity, icon with metadata indicating Certification, Authentication and Validity, Media icons for photo, video, audio, Assigned Group, assigned to, Priority, Status, Media Qty, Reports, Create On, Create By, Archived, Action; Edit incident, Open Quick view, Open Storyboard, GPS location, time, date, Plot Geo Tags, Mapping Tools, Report Development System, Search, Archive Incident, icons for mapping media, storyboard access, other actions, such as edit, dashboard, participants; personnel, subjects, contacts, management, configuration, members, audit, system reports, remote mobile application settings for download, revisions, controlling features, media resolution, accesses, default settings as example, setting selectable categories on mobile device and security parameters for the certification system.

Interface screens on the digital device provide user information integrated with work product and reports includes to name a few are mapping, GPS, Media along with, interactive control features (pop-up menus or slide up menus, or slide across, or grey areas) to highlight editable text for visual effects for both the camera system and information display menus. Additionally, an insurance claim documenting process can be performed using the initial claim information, including the claim number, the insurance policy number, the adjuster firm procedure process, assignment of claims, the processing of the claim by an adjuster utilizing a digital device and creating the loss information. This can be done by a menu structure, or fill in the blanks, or by audio prompting using a user selection, inserting information, tone or a voice. Every item will be collected or driven by the mobile computer application and immediately transmitted to the cloud and received on the other side of the cloud. This data can then be used to write formal reports, estimates, drawings, sketches and complete an Insurance claim or allow the ability to complete a virtual desk adjust the claim by using the certified media, the loss report generated by the mobile device with the media, adjuster credentials, and other forms required to satisfy the insurance carrier's requirements to pay funds to the insurance for their loss. Various screens also include metadata layers. Image layer with the ability to touch the screen and a map is visualized. This also will allow a voice note on each image when the image is touched. The voice will describe the title, notes, group and media description just by touching the image located either on the mobile device or on the cloud connected computer. Each image has the ability to play the image number, title, group, claim number, insurer, policy number, notes, description, location and has a volume control and send image to other feature.

Machine and user insertion into the metadata regarding the concurrent captured media details and facts about each media are also processed in the digital device and autoloaded at the time of capture. The media information data is editable upon capture and later editable by numerous means of media attributes via voice or keyboard; such as Incident Title, Incident Category, Comments about an Incident. Upon saving the Incident and using the media capture system for capturing images, video or audio into the system, and saving the Incident, the Incident detail page which already contains the previously inserted Incident title, category and comments appears and shows a Group search bar along with the media thumbnails of the Incident captured media. If the group system is utilized, each media is shown in its individual identified group, and can be searched by using the group search function. Each thumbnail contains the individual media Search, Title, Group Identifier, and Media Notes along with other icons showing cloud receipt, time date, time zone, and selectable map tool when selected brings up a map and maps its media location. Media can also be transferred from group to group using the "edit group" feature. Notes may be edited by using the "edit notes" feature. Titles can be edited by using "edit title" feature.

The identical information is synchronized between the mobile device and the cloud website. It is available to the user after logging into the secure website. A similar set of tools are available in the web portal to identify each incident and each media associated with each incident. Here is a list of some of those attributes. Each Incident includes a unique Incident identifier (ID) number (generated by the mobile application code), Incident number (generated by the mobile application code), Cloud website Authentication, Verification, Certification System verifies each media and marks accordingly, Title, Domain, Category, Location, Description, Assigned Group, assigned to, Priority, Status, Media Qty, Media Type, Reports, Create On, Create By, Archived, Action; Edit incident, Open Quick view, Open Storyboard, Plot Geo Tags, Archive Incident Interface screens on the digital device provide user information integrated with work product and reports includes to name a few are mapping, GPS, Media along with, interactive control features (pop-up menus or slide up menus, or slide across, or grey areas) to highlight editable text for visual effects for both the camera system and information display menus. Additionally, an insurance claim documenting process can be performed using the initial claim information, including the claim number, the insurance policy number, the adjuster firm procedure process, assignment of claims, the processing of the claim by an adjuster utilizing a digital device and creating the loss information. This can be done by a menu structure, or fill in the blanks, or by audio prompting using a tone or a voice. Every item will be collected or driven by the mobile computer application and immediately transmitted to the cloud and received on the other side of the cloud. This data can then be used to write formal reports, estimates, drawings, sketches and complete an Insurance claim, a virtual claim or allow the ability to desk adjust the claim by using the certified media, the loss report generated by the mobile device with the media, adjuster credentials, and other forms required to satisfy the insurance carrier's requirements to pay funds to the insurance for their loss. Various screens also include metadata layers. Image layer with the ability to touch the screen and a map is visualized. This also will allow a voice note on each image when the image is touched. The voice will describe the title, notes, group and media description just by touching the image located either on the mobile device or on the cloud connected computer. Each image has the ability to play the title, group, notes, description and has a volume control and send image to other feature.

Additional details such as the situational awareness, all displayed on various types of base maps, satellite photos, or computer generated national, state, city, county, towns the quantity of incidents, quantity of media per event, quantity groups of media per group, quantity of media in groups all are appended with date, various icons representing time, GPS, media location, orientation, heading, elevation, magnetic north indication, media watermarks, a digital control unit in camera provides certification/validation, editable individual media titles, categories, notes, map, cloud receipt marker, in process status indicator, audible/visual transmission verification mark sharing same thru bi-direction-communication and synchronization with the cloud portion of the system with the role of system management, mobile application management, electronic digital media organization, control, preservation, processing, storage and dissemination.

The system is made up with two major elements tied together with software and bi-directional communication. The parts are: a secure mobile application uploaded on a digital device capable of media collection and transmission. The second element is a secure web and cloud ecosystem that bi-directionally communicates with the mobile digital system and preserves, processes, stores, reports, and provides secure access to users to The system is made of an unlimited number of mobile devices, users and cloud real-time communicative secure data interactive system that captures, collects, certifies media simultaneously using a secure mobile application on a digital device while organizing and using the information from the collection process and details contained within the media; such as who, where, why, how, and other metadata; location, orientation, time/date, elevation, camera heading, acceleration, metadata, velocities, encryption along with other integrated data forms such as; editable titled events and incidents with differing editable groups of group identified media either captured now or in the future additive to prior established groups with category, title, captions, descriptions, notes, media title, metadata integrated within the individual media provides data that is used in the process organizing and maintained and storing data in a media information system so that it can be instantly interacted with at a moment's notice either on a desktop or remoted digital device. The media information system provides the framework to keep track and organize of the collection, processing, storage, dissemination, viewing, reporting, transmission, interaction, interrogation auditing, tracking of the media data.

One example is the process a media goes though in its digital life. A human using a computer, software and computer process may add, change, modify, edit or remove a voice to text, voice to text title, note, description, caption, to or from a media. Additionally, the media may be altered or modified, for example using photo editing software and/or video editing software and/or audio editing software. The media Information system must keep track of each of the permutations and revisions that the media has undergone during the its digital life while residing in the media information system. The media information system creates a permanent record stored at capture or later as modified by the system in the cloud with all of the associated data. The system has an integral audit function that shows a detailed record to the user each time the media has been moved, changed, organized, edited, printed, or changed in any way. This audit feature is the artificial intelligent system process allowing learning, digital reading of words, notes, caption associated with the media which provides outputs of the system in a form upon human request.

Each media capture has a group, category, title, note, caption, description, metadata, GPS, compass heading, relationship to magnetic/true north, elevation, orientation, certification, validation, image identification number/code, time and date attributes which allow users to now understand information contained in the media itself. Some photos/videos have at a date printed on the image itself from the photo processor or film stock. Other information surrounding the photo details/information itself is lost or forgotten over time. The Media Information System overcome the past by incorporating all the details of the media over its life and continues to expand the details as it travels through its digital life. As the conversion from analog to digital media is complete, little has been done to organize other than albums, face view, search on Apple or Microsoft Web platforms. These systems are complex and hard to use and are not a system. By that, they upload media from many sources. This media system described here specifically loads images from only the mobile application. That maintains the process. The system will allow media to be uploaded however those media will not be certified and the originality of the data cannot be proven nor trusted. There is a need for a system that incorporates the collection, processing and storage of media which incorporates the totality of data associated with the media at capture so as to not lose the information contained in the image itself by not taking the steps to preserve it and nurture its digital life.

The system provides benefits and improvements to efficiency (through automated generation of paths and mapping interfaces) and speed to technologies used in many industries. It can be used for quality assurance, litigation media evidence and preservation, lifesaving such as being able to locate a user from last media captured on their digital device before going missing or following the media trail as this application teaches. A lot of recent lost or missing humans take a media in the area they go missing from and this invention provides a new tool for first responders and police to timely locate a missing or lost human, law enforcement certified media evidence collection, fire marshal arson investigations, and preservation, transportation i.e. documenting airline issues from globally remote locations such as parts failure where the system allows collaboration in real-time with media of the issues available on attendee's computer or mobile device with 100% availability. A new recreational photo system integrating drone media, Aerial trips can be documented, along with weather observation and aerial phenomena. Medical community in that hospitals can document procedures, accidents, gunshots, claimed conditions including x-rays and witness audio recordings at the time of the incident with certified media possibly lowering medical insurance policy fees. The hospitality industry can create historical documented recorded of the status, quality, maintenance issues, theft, fraud, guest damage, water damage, accident, incidents by capturing media which will remain in the system with title, notes, descriptions, location, orientation, heading, elevation, metadata providing detailed information of the digital device capturing the media, model number, version number, among some of the many attributes.

The system operation can begin on either the website or the mobile application which can be downloaded from the website or third party such as an Application Store or marketplace. The website has a built-in configuration control and understands the version history of every mobile application tethered to the system. After login, a number of interfaces will appear. Stepping through various interfaces of the software application that runs on the media capture device provides the actions, functions, transmissions, search, media review and other activities discussed herein.

Upon the application download, a user can insert username and password that was provided previously upon system registration to sign into a system. Another interface may appear listing a number of incidents contained in the system by or otherwise accessible to the logged in user. In one example, the user may have a total of 792 incident records in the cloud system 115. The user may select, for example, the 4th incident down on the incident list page. This is an incident that has been previously captured and stored in the system. Using the system information, the user can see the information about the incident such as an example below:

INCIDENT Title May 16-26 Alaska Inside Passage (269) Media Media Group: SFO Arrival (note time/date/zone/lat/long/Heading/Elevation Media Notes: "Under the Golden Gate Bridge" Added to the incident is an emoji of a boat for quick visual reference.

The user may request generation of a new incident, and can add a title, category/group, and notes/description to the new incident. A media asset may be captured then, or may be selected from previously captured media assets. The media asset is certified as discussed with respect to FIG. 13. Additional textual, graphical, or voice-based notes or annotations may be added to the media asset and/or to the incident report. The incident report is then created based on the media asset, optionally its annotations, the incident notes or descriptions input by the user. The incident report is then transmitted to the cloud server storage system 115.

Figure 11:
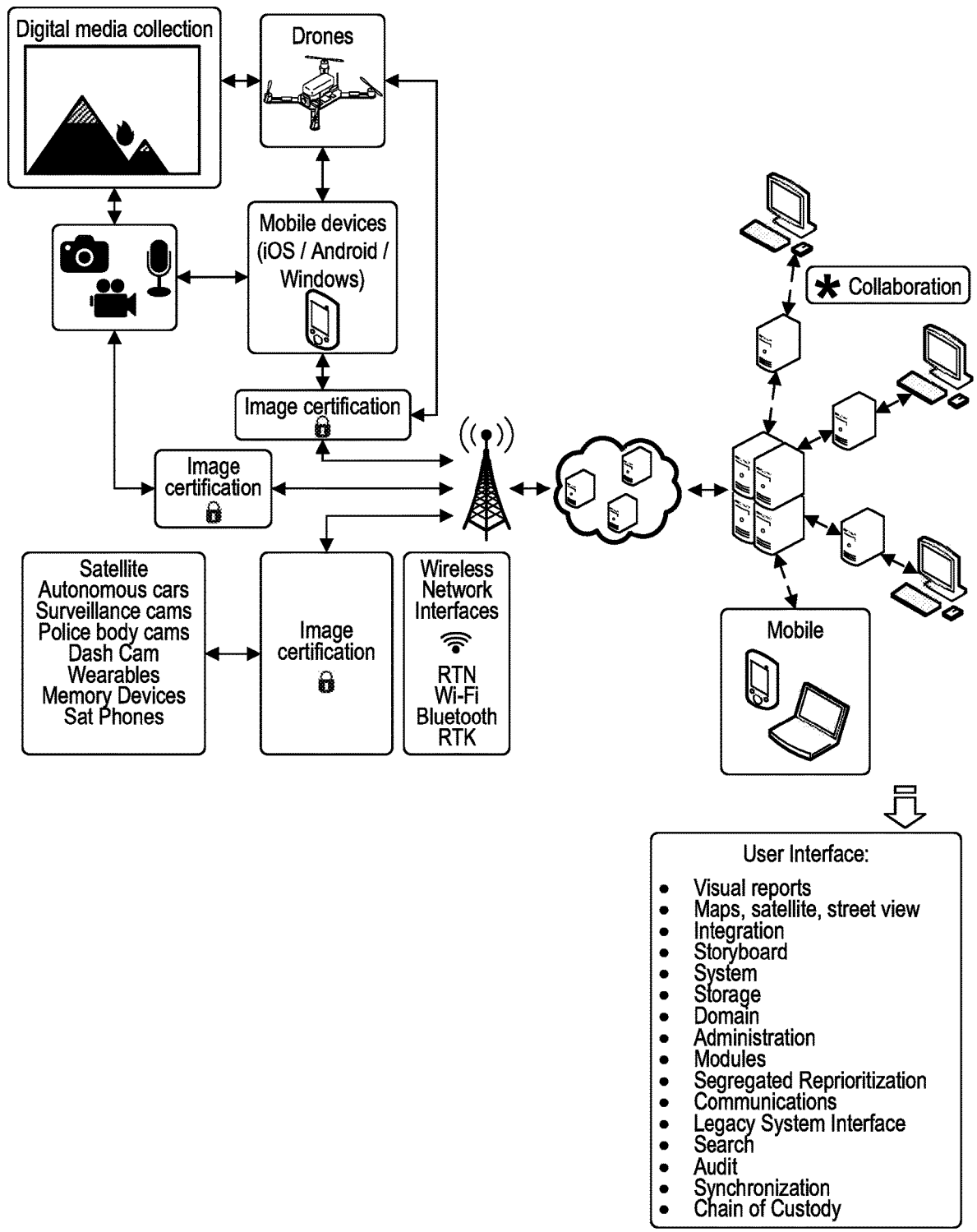
FIG. 11 illustrates an exemplary media capture system and media certification system interfacing with different types of user devices and camera devices.

FIG. 11 illustrates an exemplary media capture system and media certification system interfacing with different types of user devices and camera devices.

The image capture device collects an image as well as sensor data (as seen on the left side of FIG. 11). The data is then autonomously sent to the internet/cloud system where the digital data is filed, stored and accessed through the web in a systematic or serialized format constant with image identification formed with the image capture device (as seen on the right side of FIG. 11). This data can be transferred over a wired or a wireless connection. In some embodiments, the image capture device can first synchronize its image and/or sensor data with a second device. For example, a camera device (e.g., a digital point-and-shoot camera) may first be required to synchronize its data with a user device such as a smartphone or wearable device, which can then form a connection to the internet/cloud system. In the future these devices, i.e. handheld digital cameras, body cameras, binoculars can contain the certified media capture and transmission system and interact directly with the cloud as well as the second device.

The internet/cloud system can include one or more server systems, which may be connected to each other. In one embodiment, this internet/cloud system is a wireless multiplexed system for securely storing digital data to and from mobile digital devices. In another embodiment, the digital data (e.g., images, reports) are securely held in one central place, either by a hardware memory device, server, or a data center.

Once the data is in the internet/cloud system, it may be accessible through a web portal. This web portal may include image-editing tools, worldwide access, and collaboration mechanisms available to its users. Security, digital signature, electronic signatures, watermarking, encryption physical access, password credentials area can be utilized throughout the system. Original digital data can be confirmed, saved and protected though various technologies and system controls. The data can be further sent to other data systems such as one or more distributed ledgers (e.g., one or more blockchain ledgers) for other downstream uses. The certified data remains unchanged and in its original condition within the distributed ledger, and mechanisms within the distributed ledger may further ensure that anyone with access to the distributed ledger can verify authenticity. For example, each block of a blockchain distributed ledger may include a hash of the previous block, or a hash of the previous header, which can be verified by a viewer re-computing the hash for any particular block and checking it against the hash stored in the next block. In some cases, blocks of a blockchain can also include a Merkle Root that represents a hash of hashes of the entire ledger up until (and optionally cases including) the block in question, which can be verified in a similar way. In some embodiments, certain data integrity precautions can be taken as discussed with respect to FIG. 13.

Figure 12:
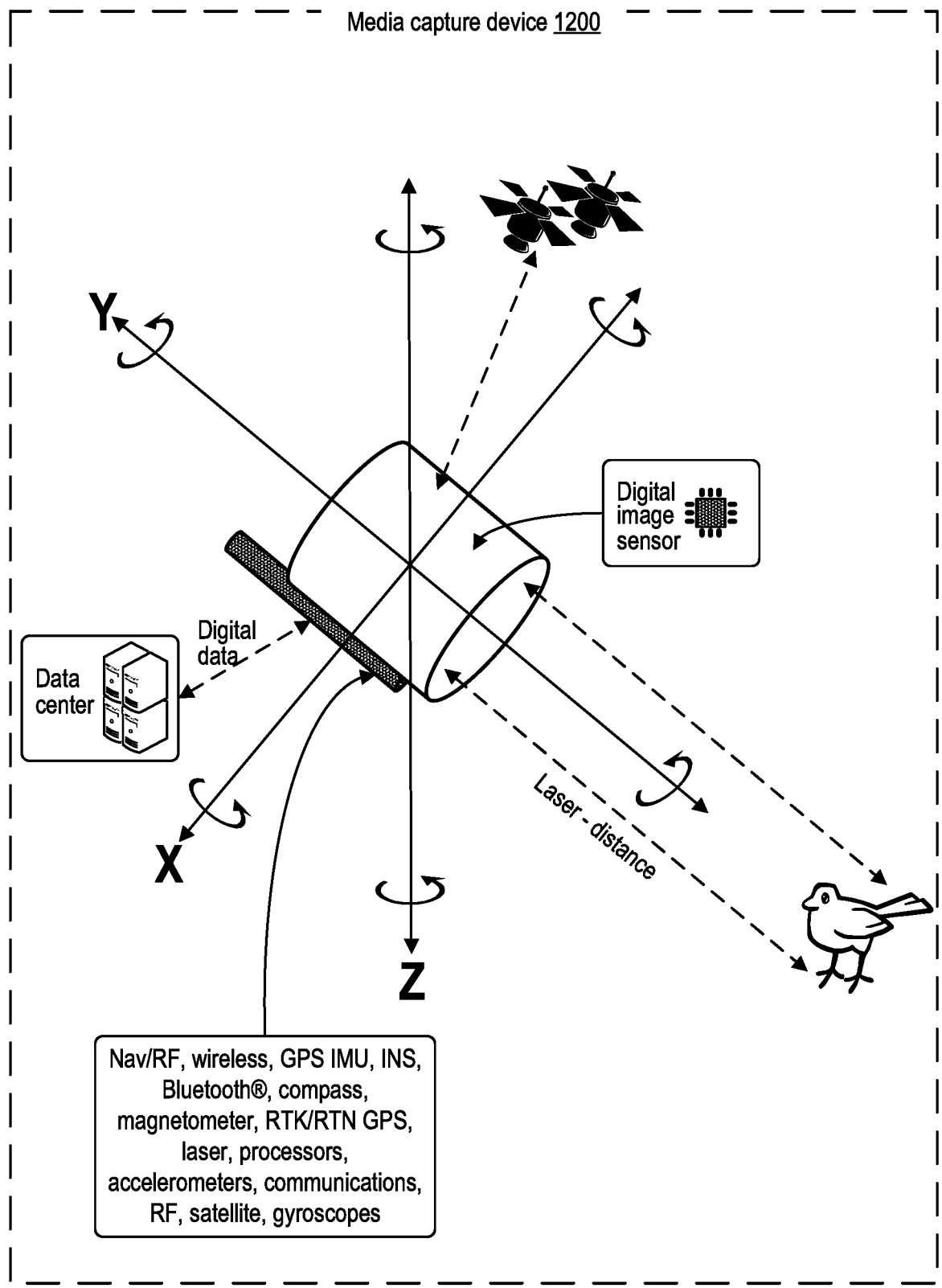
FIG. 12 illustrates a media capture device with an intelligent an image/video capture system that combines a camera image/video with a sensor data set from a sensor system.

FIG. 12 illustrates a media capture device with an intelligent image/video capture system that combines a camera image/video with sensor data set from a sensor system.

A camera image is captured by the media capture device 1200 using a camera embedded as a part of an media capture device 1200. The media capture device 1200 can be, or can include, a camera such as a digital or analog point-and-shoot camera, a digital or analog single-lens reflex "SLR" camera, a digital or analog image-capturing telescope, a digital or analog image-capturing microscope, binoculars, UAV, drone, surveillance, alarm system, doorbell camera system or a digital or analog camcorder. Consumer electronic devices with imaging componentry may also be used. For example, the media capture device 1200 can be a portable consumer user device such as a smartphone, a tablet device, a laptop computer, a wearable device, a portable gaming console, set top device, body camera, dashcam, appliance camera, gaming system, or a portable media player device all incorporating a wireless communication transceiver interface. Less mobile devices may also be used such as desktop computers, television systems, gaming consoles, and various types of conveyances.

The intelligent image sensor of the media capture device 1200 allows the user to capture images and video with greater precision and, further, to collect and gain access to metadata about the images or video. The metadata can include, for example, the exact location in latitude, longitude, and elevation of the image capture device. Captured information may further or alternatively include the roll of the image capture device, the pitch of the image capture device, the yaw of the image capture device, the velocity and/or direction of the image capture device, the viewing angle of the image capture device, the azimuth and/or compass bearing of the image capture device. Information concerning the horizon angles of the image capture device and the inclination and declination of the image capture device may likewise be collected. Such metadata can be attached to both images and video.

The digital data organization process of the intelligent image sensor of the media capture device 1200 may be controlled manually, remotely, by a user or automatically by computer hardware/software control processes. These may include organization by photos, video, audio, location, position, by image capture device, by user, by date, time, logged user, subscription user, or a number of other attributes of an image/video/audio/media file. Likewise, these images may be made searchable via these attributes in a network based (including "cloud based") storage system as well as a local storage system. In some embodiments, the captured image/video/media can also be stored and organized by facial recognition means and subsequently searched or made searchable by facial recognition applications.

Figure 13:
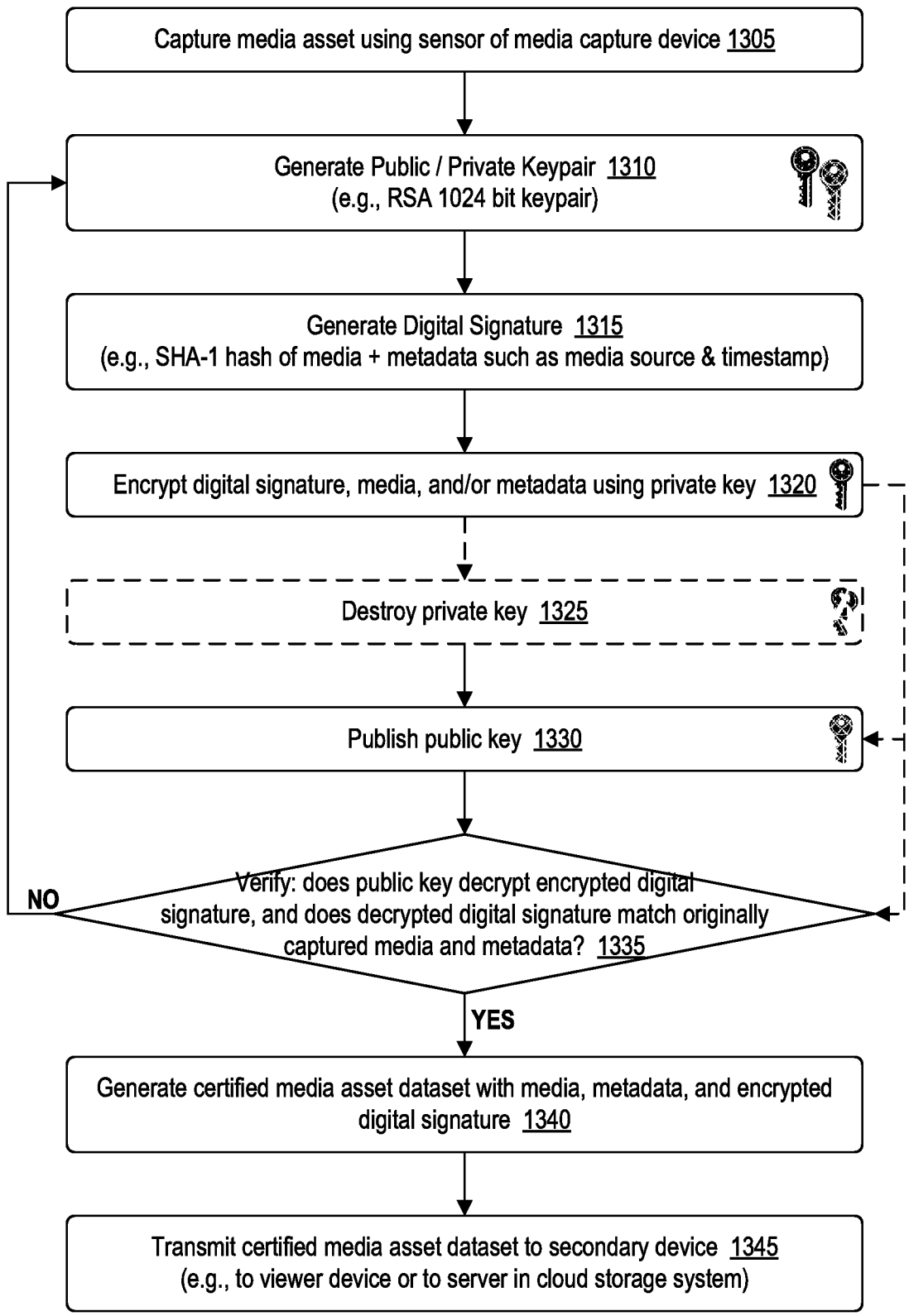
FIG. 13 is a flow diagram illustrating an exemplary method for security certification and verification of digital media.

FIG. 13 is a flow diagram illustrating an exemplary method for security certification and verification of digital media.

At step 1305, a media asset is captured by a sensor of a media capture device, optionally with its metadata as well. The metadata may include, for example, latitude and longitude coordinates from a GNSS receiver or other positioning receiver, an identification of the media capture device, a timestamp identifying date and time of capture, an altitude at capture, a heading at capture, an inclination at capture, a yaw at capture, a roll at capture, pitch at capture, a watermark, an annotation, any other data that might be found in image EXIF metadata, elevation or altitude, velocity at capture, path, speed, direction, distance, weather conditions, barometer reading & change, dew point, humidity, sun angle, temperature, compass heading, media certification status, annotation certification status, incident note certifications status, incident report certification status, event number, time, date, time zone, title, media type (IR, multi-spectrum, lidar, UV, 2 dimensionality, 3D dimensionality), wind speed, wind direction, radar data, cloud coverage, visibility, flood data, any other metadata discussed herein, or combinations thereof.

At step 1310, an asymmetric public key infrastructure (PKI) key pair—with a private key and a corresponding public key—is generated by the media capture device of step 1305 or by server 115. These may be RSA 1024 asymmetric keys.

At step 1315, a digital signature is computed by generating a hash digest—optionally using a secure hash algorithm such as SHA-0, SHA-1, SHA-2, or SHA-3—of the captured media, and optionally of the metadata as well. At step 1320, the digital signature is encrypted with the private key. The media and/or metadata may also be encrypted using the private key. The private key is optionally destroyed at step 1325, or may simply never be written to non-volatile memory in the first place.

At step 1330, the public key is published, either by sending it to the servers 115, to an authentication server such as a certificate authority, or by otherwise sending it for publication in another publicly accessible and trusted network location. At step 1335, verification as to the authenticity of the media and metadata may occur by decrypting the encrypted digital signature using the public key before or after publication at step 1330, and verifying whether or not the hash digest stored as part of the decrypted digital signature matches a newly generated hash digest of the media. If the new hash matches the hash decrypted using the public key, then verification is successful, and the media asset has not been modified since capture (or at least since certification). If the new hash does not match the hash decrypted using the public key, then verification is unsuccessful, and the media asset has been modified since capture (or at least since certification). The same can be done using the metadata if a hash digest of the metadata is included in the digital signature. The verification as to the authenticity of the media and metadata at step 1335 may also include decrypting the media asset and/or the metadata itself, if either or both were encrypted at step 1320. This verification may occur at the digital media capture device—though it may instead or additionally be performed at the server 115, for example before the server 115 indexes the media as part of a cloud storage system accessible by client devices 120.

Assuming the authentication of step 1335 was successful, a certified media dataset is generated by bundling the media, metadata, and the encrypted digital signature, for example in a zip file or other compressed archive file. The public key may also be bundled with them, though additional security may be provided by publishing it elsewhere to a trusted authentication server. At step 1345, the certified media dataset (and optionally the public key) is transmitted to a secondary device, such as a server 115 or a viewer device (i.e., a client device 120).

In some cases, other data besides the media and associated metadata may also be certified, either or separately from the media asset as discussed further in the operations 1500 of FIG. 15 or together with the certification of the media asset, in which case the hash and digital signatures at step 1315 may be hashes of the media asset as well as the other data, thereby certifying the media asset along with the other data.

In other words, the operations 1300 of FIG. 13 illustrate data integrity precautions that can be taken. For example, all non-asset data can, in some embodiments, be secured in a local database with a globally unique identifier to ensure its integrity. The asset's security and integrity can be ensured via a Digital Signature that is made up of a SHA1 digest, the time that the asset was captured and the device of origin. This allows the mobile app or server to detect changes due to storage or transmission errors as well as any attempt to manipulate or change the content of the asset. The Digital Signature can be encrypted with a public/private key-pair that is generated uniquely for that asset by the media capture device. The private key can be destroyed by the media capture device and/or never written to a disk or stored in a memory of the media capture device or any other device; as such, this ensures that the asset cannot be re-signed and cannot be changed without those changes being detectable.

More specifically, media asset data, such as image, video, and/or audio data, is captured by a camera, microphone, and/or other sensors integrated with the mobile device 105 and/or sensors connected to the mobile device 105 in a wired or wireless manner. The mobile device 105 also generates and/or extracts metadata (e.g., EXIF metadata) corresponding to this captured media asset, for example identifying the mobile device 105 itself, a timestamp of capture, a date of capture, an author or owner of the mobile device 105, and any other metadata. A digital signature is generated by generating a hash of both the captured media and at least some of this metadata. For example, the digital signature may be a hash of the captured media, the timestamp, and an identifier of the mobile device 105 that captured the media. The hash may be computed using a secure hash algorithm (SHA), such as SHA-0, SHA-1, SHA-2, or SHA-3. The mobile device and/or cloud server generate a public and private key pair using a public key infrastructure (PKI), where the keys may be for example RSA 1024 bit keys. The private key is used to encrypt the digital signature, and is then optionally deleted or erased/destroyed via overwriting for more security. The media asset, the encrypted digital signature, and the metadata are uploaded to the cloud sever system (optionally securely via HTTPS). The public key is also uploaded (optionally securely via HTTPS), either to the same cloud server system or to a different certificate authority (CA) server. The media asset and its metadata are now certified. Anyone can then retrieve the public key from the cloud server system or CA server and decrypt the encrypted digital signature to verify that it matches a hash taken of the media asset and metadata at a later time, thereby verifying that the media asset and metadata have not been changed since certification. In some cases, such a verification check is performed before the media asset and metadata and encrypted digital signature and public key are sent by the media capture device.

FIG. 14 is a flow diagram illustrating generation of a path of a capture device aligned to media captured by the capture device.

The operations 1400 of FIG. 14 may be performed, at least in part, by one or more processors of a media capture device, such as a video camera or image camera or the mobile device 105. That is, the media capture device optionally includes one or more computing devices 1600 that each include one or more processors. The process 1400 of FIG. 14 may alternately or additionally be performed by one or more processors of one or more computing devices 1600 that are coupled to the media capture device in a wired and/or wireless manner, such as the cloud server storage system 115.

At step 1405, the one or more processors receive, from a media capture device, a plurality of media assets captured by the media capture device during a time period. The media assets may include one or more images captured by a camera of the media capture device, one or more videos captured by a camera of the media capture device, one or more audio recordings captured by a microphone of the media capture device, one or more captures from a radio detection and ranging (RADAR) sensor of the media capture device, one or more captures from a light detection and ranging (LIDAR) sensor of the media capture device, one or more captures from a sound navigation and ranging (SONAR) or sound detection and ranging (SODAR) sensor of the media capture device, or some combination thereof.

At step 1410, the one or more processors receive a plurality of timestamps, each timestamp associated with capture of one of the plurality of media assets by the media capture device. Each of the plurality of timestamps falls within the time period. The timestamps may correspond to a moment in which a particular media asset was captured when the capture occurs in an instant or during a short range of time, such as capture of an image by a camera or of media from a RADAR, LIDAR, SONAR, or SODAR sensor. The timestamps may correspond to a beginning and/or an end of capture of a particular media asset that is captured over a duration of time—from a moment at which capture or recording begins to a moment at which capture or recording ends—such as a video captured by a camera or an audio recording captured by a microphone. Where the plurality of media assets include various types of media—such as a mix of images and videos—the plurality of timestamps may include timestamps of both types, which may include metadata tags identifying what media asset the timestamp corresponds to and whether the timestamp signifies a moment of capture, a beginning of capture, or an end of capture.

At step 1415, the one or more processors receive a plurality of locations, each location associated with capture of one of the plurality of media assets by the media capture device. Each media asset may be associated with one or more of the plurality of locations, and each timestamp may be associated with one or more of the plurality of locations. That is, a location may be received that identifies a location that the media capture device was in at a moment in which a particular media asset was captured when the capture occurs in an instant or during a short range of time, such as capture of an image by a camera or of media from a RADAR, LIDAR, SONAR, or SODAR sensor. A location may be received that identifies a location that the media capture device was in at a beginning and/or an end of capture of a particular media asset that is captured over a duration of time—from a moment at which capture or recording begins to a moment at which capture or recording ends—such as a video captured by a camera or an audio recording captured by a microphone. Where the plurality of media assets include various types of media—such as a mix of images and videos—the plurality of locations may include locations of both types, which may include metadata tags identifying what media asset the locations corresponds to and whether the locations corresponds to a location of the media capture device at a moment of capture, a location of the media capture device at a beginning of capture, or a location of the media capture device at an end of capture. Each location may be identified by the media capture device based on a positioning receiver of the media capture device, such as a GNSS receiver, a Bluetooth beacon positioning receiver, a cell signal receiver, a WLAN receiver, or some combination thereof.

At step 1420, the one or more processors generate a path of captures by the media capture device during the time period, the path connecting the plurality of locations based on the plurality of timestamps. That is, each location of the plurality of locations is joined together by a straight or curved line in an order dictated by the timestamps that each location corresponds to, or by an order of capture of the media assets that correspond to the locations, or some combination thereof. The paths of FIG. 6, FIG. 8, FIG. 9, and FIG. 10 are examples of paths that may be generated at step 1420.

In some cases, additional timestamps and corresponding locations may be received at steps 1410 and 1415 corresponding to one or more times between capture of one media asset and capture of another media asset by the media capture device. Additional timestamps and corresponding locations may also be received at steps 1410 and 1415 corresponding to one or more times during capture of a media capture data set between the beginning of capture and the end of capture, for example identifying multiple locations during capture of a video between the beginning of recording of the video and the end of recording of the video. Such additional locations may be used to generate a smoother path at step 1420, or a path tracking the movement of the media assets periodically during the entire time period, not just at moments related to an instant of capture, a beginning of capture, and/or an end of capture. This prevents missing data or large gaps in the path that is generated at step 1420. For example, the path of FIG. 6 includes six locations that correspond to image captures (and capture of additional data as discussed above), but the lines between the points corresponding to the six captures are not straight—they instead curve along a path that the media capture device followed between captures, which is identified at step 1420 based on location and timestamp data captured between any two of the captures.

The location data of step 1415 may include just latitude and longitude data, or may alternately include other measurements, which may then be identified and represented in the path. For example, the direction that the media capture device is facing (optionally including direction, heading, roll, pitch, and/or yaw) at a time corresponding to a particular timestamp (e.g., at the beginning of capture, at the end of capture, during capture, or a different time) may be captured via sensors of the media capture device (e.g., one or more gyroscopes, accelerometers, altimeters, motion sensors, or combinations thereof), received by the one or more processors, and then represented in the path, for example as in the arrows and field-of-view cones illustrated at each point of the top-down view path of FIG. 8. In some cases, the altitude or elevation of the media capture device at a time corresponding to a particular timestamp (e.g., at the beginning of capture, at the end of capture, during capture, or a different time) may be captured via sensors of the media capture device (e.g., one or more altimeters, gyroscopes, accelerometers, motion sensors, or combinations thereof), received by the one or more processors, and then represented in the path, for example as in the vertical axis in the side-view path that is illustrated at the bottom of FIG. 9 and within the report of FIG. 10. The path generated at step 1420 may be a top-down view path connecting points that are charted along two directional latitude and longitude axes, such as the path overlaid over the map of FIG. 6 or the path of FIG. 8. The path generated at step 1420 may be a side view path connecting points that are charted along one directional axis and one altitude axis, such as the path of path that is illustrated at the bottom of FIG. 9 and within the report of FIG. 10. In the side view path of FIG. 9, the single directional axis may represent movement in a specific direction (e.g., along a latitude axis or along a longitude axis or some axis in between) or may represent distance in any direction within the latitude-longitude plane.

At step 1425, the one or more processors render an interface for display on a screen, the interface aligning the plurality of media assets along the path. The interface may overlay the path over a map as in FIG. 6, and may align images beside each capture location along the path.

FIG. 15 is a flow diagram illustrating tracking of media and its use through certification.

The operations 1500 of FIG. 15 may be performed, at least in part, by one or more processors of a media capture device, such as a video camera or image camera or the mobile device 105. That is, the media capture device optionally includes one or more computing devices 1600 that each include one or more processors. The process 1500 of FIG. 15 may alternately or additionally be performed by one or more processors of one or more computing devices 1600 that are coupled to the media capture device in a wired and/or wireless manner, such as the cloud server storage system 115 or the user/client computer 120.

At step 1505, the one or more processors receive a captured media asset and its associated metadata as captured by the media capture device. At step 1510, the one or more processors certify the media asset and optionally its associated metadata as described with respect to the operations 1300 of FIG. 13, thereby generating a certified media asset dataset as discussed with respect to step 1340 of FIG. 13. At step 1515, the one or more processors optionally verify that the certified media asset dataset is unchanged since its certification and then optionally synchronize the certified media asset dataset with the cloud server system 115 by sending the certified media asset dataset to the cloud server system 115, allowing the certified media asset dataset to be accessed by user devices 120. Verification is performed by comparing a newly generated hash of the media asset to a hash extracted by decrypting an encrypted digital signature from the certified media asset dataset using a public key associated with the certified media asset dataset as discussed further with respect to operations 1300 of FIG. 13. Optionally, step 1510 and/or step 1515 may be followed by step 1505 if another media asset is captured and certified; otherwise, step 1510 and/or step 1515 may be followed by step 1520.

At step 1520, the one or more processors receive an annotation associated with the media asset and/or of the certified media asset dataset, such as a voice note discussing the media asset or its metadata, a written note discussing the media asset or its metadata, or a graphical note (e.g., a marking on the media asset or its metadata that circles or crosses out a portion of the media asset or its metadata). At step 1520, the one or more processors optionally also receive metadata associated with the annotation, such as an author of the annotation, a category of the annotation, a title of the annotation, any other type of metadata discussed herein, or some combination thereof. At step 1525, the one or more processors certify the annotation and optionally its associated metadata as described with respect to the operations 1300 of FIG. 13, thereby generating a certified annotation dataset as discussed with respect to step 1340 of FIG. 13. That is, the operations of FIG. 13 are performed, though the annotation is inserted in place of the media asset. Thus, the hash generated at step 1315 in this situation is a hash of the annotation and/or of the metadata of the annotation, not a hash of the media asset or the metadata of the media asset. Alternately, the certified annotation dataset may be a certified version of the media asset with the annotation included, for example where the visual marking alters the media asset itself, and with the metadata of the annotation appended or included side-by-side with the metadata of the media asset. Thus, the hash generated at step 1315 in this situation is a hash of the alerted media asset that includes the annotation and/or of the metadata of the annotation and the media asset. At step 1530, the one or more processors optionally verify that the certified annotation dataset is unchanged since its certification and then optionally synchronize the certified annotation dataset with the cloud server system 115 by sending the certified annotation dataset to the cloud server system 115, allowing the certified annotation dataset to be accessed by user devices 120. Verification is performed by comparing a newly generated hash of the annotation to a hash extracted by decrypting an encrypted digital signature from the certified annotation dataset using a public key associated with the certified annotation dataset as discussed further with respect to operations 1300 of FIG. 13. Optionally, step 1525 and/or step 1530 may be followed by step 1520 if another annotation is received and certified; otherwise, step 1525 and/or step 1530 may be followed by step 1535.

At step 1535, the one or more processors receive an incident description of an incident associated with the media asset and/or of the certified media asset dataset and/or of the annotation and/or of the certified annotation dataset. The incident description describes the incident using a written note, a voice note, and/or an illustration input by a user or generated by a computing device. An incident description in the context of step 1535 (and the other steps of the operations 1500) may also include other analysis of the media asset, or of multiple media assets, that will be used for an incident report, such as the path 605 generated in FIG. 6, the path 800 generated in FIG. 8, the map analysis 910 of FIG. 9 and FIG. 10, the focuses analysis 920 of FIG. 9 and FIG. 10, the elevation analysis 930 of FIG. 9 and FIG. 10, the incident description 1020 of FIG. 10, the media mapping path 1010 of FIG. 10, or some combination thereof. At step 1535, the one or more processors optionally also receive metadata associated with the incident description, such as an author of the incident description, a category of the incident description, a title of the incident description, any other type of metadata discussed herein, or some combination thereof. At step 1540, the one or more processors certify the incident description and optionally its associated metadata as described with respect to the operations 1300 of FIG. 13, thereby generating a certified incident description dataset as discussed with respect to step 1340 of FIG. 13. That is, the operations of FIG. 13 are performed, though the incident description is inserted in place of the media asset. Thus, the hash generated at step 1315 in this situation is a hash of the incident description and/or of the metadata of the incident description, not a hash of the media asset or the metadata of the media asset. Alternately, the certified incident description dataset may be a certified version of the incident description alongside the certified media asset dataset and/or the certified annotation dataset, and with the metadata of the incident description appended or included side-by-side with the metadata of the media asset and/or the metadata of the annotation. Thus, the hash generated at step 1315 in this situation is a hash of the combination of the incident description, media asset, annotation, and/or metadata of any combination of these three. At step 1545, the one or more processors optionally verify that the certified incident description dataset is unchanged since its certification and then optionally synchronize the certified incident description dataset with the cloud server system 115 by sending the certified incident description dataset to the cloud server system 115, allowing the certified incident description dataset to be accessed by user devices 120. Verification is performed by comparing a newly generated hash of the incident description to a hash extracted by decrypting an encrypted digital signature from the certified incident description dataset using a public key associated with the certified incident description dataset as discussed further with respect to operations 1300 of FIG. 13. Optionally, step 1540 and/or step 1545 may be followed by step 1535 if another incident description is received and certified; otherwise, step 1540 and/or step 1545 may be followed by step 1550.

At step 1550, the one or more processors generate an incident report that includes the certified media asset dataset, the certified annotation dataset, and/or the certified incident description dataset. That is, the incident report may include any one or one, two, or three of these. The incident report may also include the metadata for any one, two, or three of these, certified or not. One example of an incident report is illustrated in FIG. 10. At step 1550, the one or more processors optionally also receive metadata associated with the incident report, such as an author of the incident report, a category of the incident report, a title of the incident report, any other type of metadata discussed herein, or some combination thereof. At step 1555, the one or more processors certify the incident report and optionally its associated metadata as described with respect to the operations 1300 of FIG. 13, thereby generating a certified report dataset as discussed with respect to step 1340 of FIG. 13. That is, the operations of FIG. 13 are performed, though the incident report is inserted in place of the media asset. Thus, the hash generated at step 1315 in this situation is a hash of the incident report and/or of the metadata of the incident report, not a hash of the media asset or the metadata of the media asset. At step 1560, the one or more processors optionally verify that the certified report dataset is unchanged since its certification and then optionally synchronize the certified report dataset with the cloud server system 115 by sending the certified report dataset to the cloud server system 115, allowing the certified report dataset to be accessed by user devices 120. Verification is performed by comparing a newly generated hash of the incident report to a hash extracted by decrypting an encrypted digital signature from the certified report dataset using a public key associated with the certified report dataset as discussed further with respect to operations 1300 of FIG. 13.

The systems and methods described herein are more efficient, accurate, fraud resistant, consistent, portable, and convenient than any previous methods or systems for adjusters. The unique mobile device and cloud server system architecture also allows domains and secure user groups for multiple simultaneous users with complete data separation under user management, user permission groups able to see data simultaneously if they hold the correct approved system user permissions and/or credentials for their system domain or domains. That is, different users might be able to see different media assets and/or different incidents depending on permission levels and/or credentials associated with identifiers (e.g., usernames, names, email addresses, badge numbers, employee numbers, etc.) of those individuals. Data is produced in a more consistent form using mobile application and cloud based process of collecting media and data in a collection system that is mobile and cloud based.

Figure 16:
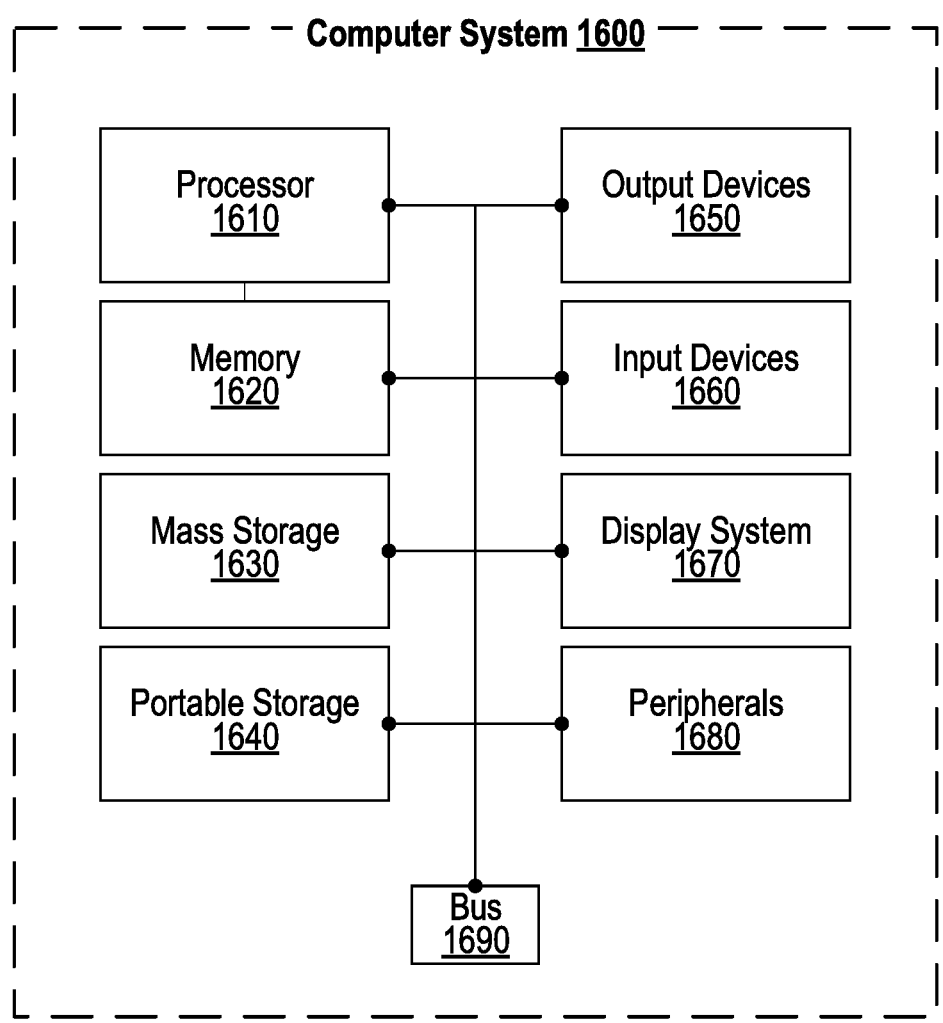
FIG. 16 is a block diagram of an exemplary computing device that may be used to implement some aspects of the subject technology.

FIG. 16 is a block diagram of an exemplary computing device that may be used to implement some aspects of the subject technology. In particular, FIG. 16 illustrates an exemplary computing system 1600 that may be used to implement some aspects of the subject technology. For example, any of the computing devices, computing systems, network devices, network systems, servers, and/or arrangements of circuitry described herein may include at least one computing system 1600, or may include at least one component of the computer system 1600 identified in FIG. 16. The computing system 1600 of FIG. 16 includes one or more processors 1610 and memory 1620. Each of the processor(s) 1610 may refer to one or more processors, controllers, microcontrollers, central processing units (CPUs), graphics processing units (GPUs), arithmetic logic units (ALUs), accelerated processing units (APUs), digital signal processors (DSPs), application specific integrated circuits (ASICs), field-programmable gate arrays (FPGAs), or combinations thereof. Each of the processor(s) 1610 may include one or more cores, either integrated onto a single chip or spread across multiple chips connected or coupled together. Memory 1620 stores, in part, instructions and data for execution by processor 1610. Memory 1620 can store the executable code when in operation. The system 1600 of FIG. 16 further includes a mass storage device 1630, portable storage medium drive(s) 1640, output devices 1650, user input devices 1660, a graphics display 1670, and peripheral devices 1680.

The components shown in FIG. 16 are depicted as being connected via a single bus 1690. However, the components may be connected through one or more data transport means. For example, processor unit 1610 and memory 1620 may be connected via a local microprocessor bus, and the mass storage device 1630, peripheral device(s) 1680, portable storage device 1640, and display system 1670 may be connected via one or more input/output (I/O) buses.

Mass storage device 1630, which may be implemented with a magnetic disk drive or an optical disk drive, is a non-volatile storage device for storing data and instructions for use by processor unit 1610. Mass storage device 1630 can store the system software for implementing some aspects of the subject technology for purposes of loading that software into memory 1620.

Portable storage device 1640 operates in conjunction with a portable non-volatile storage medium, such as a floppy disk, compact disk or Digital video disc, to input and output data and code to and from the computer system 1600 of FIG.

16. The system software for implementing aspects of the subject technology may be stored on such a portable medium and input to the computer system 1600 via the portable storage device 1640.

The memory 1620, mass storage device 1630, or portable storage 1640 may in some cases store sensitive information, such as transaction information, health information, or cryptographic keys, and may in some cases encrypt or decrypt such information with the aid of the processor 1610. The memory 1620, mass storage device 1630, or portable storage 1640 may in some cases store, at least in part, instructions, executable code, or other data for execution or processing by the processor 1610.

Output devices 1650 may include, for example, communication circuitry for outputting data through wired or wireless means, display circuitry for displaying data via a display screen, audio circuitry for outputting audio via headphones or a speaker, printer circuitry for printing data via a printer, or some combination thereof. The display screen may be any type of display discussed with respect to the display system 1670. The printer may be inkjet, laserjet, thermal, or some combination thereof. In some cases, the output device circuitry 1650 may allow for transmission of data over an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, a radio-frequency identification (RFID) wireless signal transfer, near-field communications (NFC) wireless signal transfer, 802.11 Wi-Fi wireless signal transfer, cellular data network wireless signal transfer, a radio wave signal transfer, a microwave signal transfer, an infrared signal transfer, a visible light signal transfer, an ultraviolet signal transfer, a wireless signal transfer along the electromagnetic spectrum, or some combination thereof. Output devices 1650 may include any ports, plugs, antennae, wired or wireless transmitters, wired or wireless transceivers, or any other components necessary for or usable to implement the communication types listed above, such as cellular Subscriber Identity Module (SIM) cards.

Input devices 1660 may include circuitry providing a portion of a user interface. Input devices 1660 may include an alpha-numeric keypad, such as a keyboard, for inputting alpha-numeric and other information, or a pointing device, such as a mouse, a trackball, stylus, or cursor direction keys. Input devices 1660 may include touch-sensitive surfaces as well, either integrated with a display as in a touchscreen, or separate from a display as in a trackpad. Touch-sensitive surfaces may in some cases detect localized variable pressure or force detection. In some cases, the input device circuitry may allow for receipt of data over an audio jack, a microphone jack, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, a radio-frequency identification (RFID) wireless signal transfer, near-field communications (NFC) wireless signal transfer, 802.11 Wi-Fi wireless signal transfer, cellular data network wireless signal transfer, a radio wave signal transfer, a microwave signal transfer, an infrared signal transfer, a visible light signal transfer, an ultraviolet signal transfer, a wireless signal transfer along the electromagnetic spectrum, or some combination thereof. Input devices 1660 may include any ports, plugs, antennae, wired or wireless receivers, wired or wireless transceivers, or any other components necessary for or usable to implement the communication types listed above, such as cellular SIM cards.

Display system 1670 may include a liquid crystal display (LCD), a plasma display, an organic light-emitting diode (OLED) display, an electronic ink or "e-paper" display, a projector-based display, a holographic display, or another suitable display device. Display system 1670 receives textual and graphical information, and processes the information for output to the display device. The display system 1670 may include multiple-touch touchscreen input capabilities, such as capacitive touch detection, resistive touch detection, surface acoustic wave touch detection, or infrared touch detection. Such touchscreen input capabilities may or may not allow for variable pressure or force detection.

Peripherals 1680 may include any type of computer support device to add additional functionality to the computer system. For example, peripheral device(s) 1680 may include a modem, a router, an antenna, a printer, a bar code scanner, a quick-response ("QR") code scanner, a document/image scanner, a visible light camera, a thermal/infrared camera, an ultraviolet-sensitive camera, a night vision camera, a light sensor, a battery, a power source, or some combination thereof.

The components contained in the computer system 1600 of FIG. 16 are those typically found in computer systems that may be suitable for use with some aspects of the subject technology and are intended to represent a broad category of such computer components that are well known in the art. Thus, the computer system 1600 of FIG. 16 can be a personal computer, a hand held computing device, a telephone ("smart" or otherwise), a mobile computing device, a workstation, a server (on a server rack or otherwise), a minicomputer, a mainframe computer, a tablet computing device, a wearable device (such as a watch, a ring, a pair of glasses, or another type of jewelry/clothing/accessory), a video game console (portable or otherwise), an e-book reader, a media player device (portable or otherwise), a vehicle-based computer, some combination thereof, or any other computing device. The computer system 1600 may in some cases be a virtual computer system executed by another computer system. The computer can also include different bus configurations, networked platforms, multi-processor platforms, etc. Various operating systems can be used including Unix, Linux, Windows, Macintosh OS, Palm OS, Android, iOS, and other suitable operating systems.

In some cases, the computer system 1600 may be part of a multi-computer system that uses multiple computer systems 1600, each for one or more specific tasks or purposes. For example, the multi-computer system may include multiple computer systems 1600 communicatively coupled together via at least one of a personal area network (PAN), a local area network (LAN), a wireless local area network (WLAN), a municipal area network (MAN), a wide area network (WAN), or some combination thereof. The multi-computer system may further include multiple computer systems 1600 from different networks communicatively coupled together via the Internet (also known as a "distributed" system).

Some aspects of the subject technology may be implemented in an application that may be operable using a variety of devices. Non-transitory computer-readable storage media refer to any medium or media that participate in providing instructions to a central processing unit (CPU) for execution and that may be used in the memory 1620, the mass storage 1630, the portable storage 1640, or some combination thereof. Such media can take many forms, including, but not limited to, non-volatile and volatile media such as optical or magnetic disks and dynamic memory, respectively. Some forms of non-transitory computer-readable media include, for example, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a Europay®/Mastercard®/Visa® (EMV) chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L16), resistive random-access memory (RRAM/Re-RAM), phase change memory (PCM), spin transfer torque RAM (STT-RAM), another memory chip or cartridge, or a combination thereof.

Various forms of transmission media may be involved in carrying one or more sequences of one or more instructions to a processor 1610 for execution. A bus 1690 carries the data to system RAM or another memory 1620, from which a processor 1610 retrieves and executes the instructions. The instructions received by system RAM or another memory 1620 can optionally be stored on a fixed disk (mass storage device 1630/portable storage 1640) either before or after execution by processor 1610. Various forms of storage may likewise be implemented as well as the necessary network interfaces and network topologies to implement the same.

While various flow diagrams provided and described above may show a particular order of operations performed by some embodiments of the subject technology, it should be understood that such order is exemplary. Alternative embodiments may perform the operations in a different order, combine certain operations, overlap certain operations, or some combination thereof.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A method comprising:
    receiving, from a media capture device, a plurality of media assets captured by the media capture device during a time period;
    receiving a plurality of timestamps, each timestamp associated with capture of one of the plurality of media assets by the media capture device, wherein each of the plurality of timestamps falls within the time period;
    receiving a plurality of locations, each location associated with capture of one of the plurality of media assets by the media capture device;
    generating a path of captures by the media capture device during the time period, the path connecting the plurality of locations based on the plurality of timestamps;
    receiving, after capture of the plurality of media assets, user input that includes one or more annotations associated with the plurality of media assets and metadata associated with the one or more annotations;
    certifying each of the plurality of media assets at least in part by hashing data that includes at least a portion of the one or more annotations and the metadata associated with the one or more annotations; and
    rendering an interface for display on a screen, the interface aligning the plurality of media assets along the path.

2. The method of claim 1, further comprising verifying that the plurality of media assets are unaltered since capture based on one or more digital signatures that are encrypted using one or more private keys, wherein verifying that the plurality of media assets are unaltered since capture includes decrypting the one or more digital signatures using one or more public keys corresponding to the one or more private keys.

3. The method of claim 1, further comprising verifying that the plurality of timestamps and the plurality of locations are unaltered since capture based on one or more certification datasets.

4. The method of claim 1, wherein the plurality of media assets include an image, wherein the media capture device includes a camera that captures the image.

5. The method of claim 1, wherein the plurality of media assets include a video, wherein the media capture device includes a camera that captures the video.

6. The method of claim 1, wherein the plurality of media assets include an audio recording, wherein the media capture device includes a microphone that captures the audio recording.

7. The method of claim 1, wherein an altitude of the media capture device is included as part of at least one location of the plurality of locations, and wherein the path includes a representation of the altitude.

8. The method of claim 1, wherein a direction that the media capture device is facing is included as part of at least one location of the plurality of locations, and wherein the path includes a representation of the direction.

9. The method of claim 1, further comprising generating a report aligning the plurality of media assets along the path, the report also including information describing one or more objects depicted in at least a subset of the plurality of media assets, wherein rendering the interface for display on a screen includes rendering the report for display on the screen.

10. The method of claim 1, wherein the plurality of locations include one or more locations associated with a time between capture of two of the plurality of media assets by the media capture device.

11. The method of claim 1, wherein the one or more annotations are user annotations.

12. A system comprising:
    a media capture device that captures a plurality of media assets during a time period;
    a memory storing instructions; and
    a processor that executes the instructions, wherein execution of the instructions by the processor causes the processor to:
        receive the plurality of media assets captured by the media capture device during the time period, receive a plurality of timestamps, each timestamp associated with capture of one of the plurality of media assets by the media capture device, wherein each of the plurality of timestamps falls within the time period, receive a plurality of locations, each location associated with capture of one of the plurality of media assets by the media capture device, generate a path of captures by the media capture device during the time period, the path connecting the plurality of locations based on the plurality of timestamps, receive, after capture of the plurality of media assets, user input that includes one or more annotations associated with the plurality of media assets and metadata associated with the one or more annotations, certify each of the plurality of media assets at least in part by hashing data that includes at least a portion of the one or more annotations and metadata associated with the one or more annotations, and render an interface for display on a screen, the interface aligning the plurality of media assets along the path.

13. The system of claim 12, wherein execution of the instructions by the processor causes the processor to further:

verify that the plurality of media assets are unaltered since capture based on one or more digital signatures that are encrypted using one or more private keys, wherein verifying that the plurality of media assets are unaltered since capture includes decrypting the one or more digital signatures using one or more public keys corresponding to the one or more private keys.

14. The system of claim 12, wherein execution of the instructions by the processor causes the processor to further:

verify that the plurality of timestamps and the plurality of locations are unaltered since capture based on one or more certification datasets.

15. The system of claim 12, wherein the plurality of media assets include an image, wherein the media capture device includes a camera that captures the image.

16. The system of claim 12, wherein the plurality of media assets include a video, wherein the media capture device includes a camera that captures the video.

17. The system of claim 12, wherein the plurality of media assets include an audio recording, wherein the media capture device includes a microphone that captures the audio recording.

18. The system of claim 12, wherein an altitude of the media capture device is included as part of at least one location of the plurality of locations, and wherein the path includes a representation of the altitude.

19. The system of claim 12, wherein a direction that the media capture device is facing is included as part of at least one location of the plurality of locations, and wherein the path includes a representation of the direction.

20. The system of claim 12, further comprising generating a report aligning the plurality of media assets along the path, the report also including information describing one or more objects depicted in at least a subset of the plurality of media assets, wherein rendering the interface for display on a screen includes rendering the report for display on the screen.

21. A non-transitory computer readable storage medium having embodied thereon a program, wherein the program is executable by a processor to perform a method comprising:

receiving, from a media capture device, a plurality of media assets captured by the media capture device during a time period;

receiving a plurality of timestamps, each timestamp associated with capture of one of the plurality of media assets by the media capture device, wherein each of the plurality of timestamps falls within the time period;

receiving a plurality of locations, each location associated with capture of one of the plurality of media assets by the media capture device;

generating a path of captures by the media capture device during the time period, the path connecting the plurality of locations based on the plurality of timestamps;

receiving, after capture of the plurality of media assets, user input that includes one or more annotations associated with the plurality of media assets and metadata associated with the one or more annotations;

certifying each of the plurality of media assets at least in part by hashing data that includes at least a portion of the one or more annotations and metadata associated with the one or more annotations; and rendering an interface for display on a screen, the interface aligning the plurality of media assets along the path.

* * * * *